(12) United States Patent
Zhang et al.

(10) Patent No.: US 10,045,041 B2
(45) Date of Patent: Aug. 7, 2018

(54) TECHNIQUES FOR INTER-LAYER RESIDUAL PREDICTION

(71) Applicant: INTEL CORPORATION, Santa Clara, CA (US)

(72) Inventors: Wenhao Zhang, Beijing (CN); Yi-Jen Chiu, San Jose, CA (US); Lidong Xu, Beijing (CN); Yu Han, Beijing (CN); Zhipin Deng, Beijing (CN); Xiaoxia Cai, Beijing (CN)

(73) Assignee: INTEL CORPORATION, Santa Clara, CA (US)

( * ) Notice: Subject to any disclaimer, the term of this patent is extended or adjusted under 35 U.S.C. 154(b) by 254 days.

(21) Appl. No.: 14/782,593

(22) PCT Filed: Dec. 23, 2013

(86) PCT No.: PCT/CN2013/090221
§ 371 (c)(1),
(2) Date: Oct. 5, 2015

(87) PCT Pub. No.: WO2014/161355
PCT Pub. Date: Oct. 9, 2014

(65) Prior Publication Data
US 2016/0073126 A1 Mar. 10, 2016

Related U.S. Application Data

(60) Provisional application No. 61/808,883, filed on Apr. 5, 2013.

(51) Int. Cl.
*H04N 11/02* (2006.01)
*H04N 19/51* (2014.01)
*H04N 19/50* (2014.01)
*H04N 19/176* (2014.01)
(Continued)

(52) U.S. Cl.
CPC .......... *H04N 19/51* (2014.11); *H04N 19/103* (2014.11); *H04N 19/157* (2014.11);
(Continued)

(58) Field of Classification Search
CPC ...................................... H04N 19/51
(Continued)

(56) References Cited

U.S. PATENT DOCUMENTS

| | | | | |
|---|---|---|---|---|
| 8,218,628 B2* | 7/2012 | Schwarz | ............ | H04N 19/0003 375/240.08 |
| 8,264,968 B2* | 9/2012 | Park | ..................... | H04N 19/103 345/530 |

(Continued)

FOREIGN PATENT DOCUMENTS

| | | |
|---|---|---|
| CN | 102088605 | 6/2011 |
| WO | 2006108863 | 10/2006 |

OTHER PUBLICATIONS

Innternational Search Report and Written Opinion received for PCT Patent Application No. PCT/CN2013/090221, dated Feb. 27, 2014, 11 pages.

*Primary Examiner* — Leron Beck

(57) ABSTRACT

Techniques for inter-layer residual prediction are described. In one embodiment, for example, an apparatus may comprise an encoding component to determine whether a predicted motion for an enhancement layer block is consistent with a predicted motion for a collocated lower-layer block, determine whether to apply inter-layer residual prediction to the enhancement layer block based on whether the predicted motion for the enhancement layer block is consistent with the predicted motion for the collocated lower-layer block, and in response to a determination that inter-layer residual prediction is to be applied to the enhancement layer block, generate a predicted residual for the enhancement layer block based on a residual for the collocated lower-layer
(Continued)

block and generate a second-order residual for the enhancement layer block by comparing a calculated residual to the predicted residual. Other embodiments are described and claimed.

19 Claims, 8 Drawing Sheets

(51) Int. Cl.
  *H04N 19/30* (2014.01)
  *H04N 19/61* (2014.01)
  *H04N 19/103* (2014.01)
  *H04N 19/157* (2014.01)
  *H04N 19/187* (2014.01)
  *H04N 19/19* (2014.01)

(52) U.S. Cl.
  CPC ......... *H04N 19/176* (2014.11); *H04N 19/187* (2014.11); *H04N 19/19* (2014.11); *H04N 19/30* (2014.11); *H04N 19/50* (2014.11); *H04N 19/61* (2014.11)

(58) Field of Classification Search
  USPC ........................................ 375/240.01–240.29
  See application file for complete search history.

(56) References Cited

U.S. PATENT DOCUMENTS

| | | | |
|---|---|---|---|
| 8,351,502 B2* | 1/2013 | Lee | H04N 19/70 375/240.12 |
| 2006/0120454 A1* | 6/2006 | Park | H04N 19/52 375/240.16 |
| 2008/0225952 A1 | 9/2008 | Wang et al. | |
| 2009/0103622 A1* | 4/2009 | Tripathi | H04N 19/176 375/240.16 |
| 2010/0208810 A1 | 8/2010 | Yin et al. | |
| 2010/0310184 A1 | 12/2010 | Yu et al. | |
| 2014/0064373 A1* | 3/2014 | Le Leannec | H04N 19/00424 375/240.16 |

\* cited by examiner

*FIG. 5*

Storage Medium 500

Computer Executable Instructions for 300

Computer Executable Instructions for 400

TECHNIQUES FOR INTER-LAYER RESIDUAL PREDICTION

RELATED CASE

This application claims priority to U.S. Provisional Patent Application No. 61/808,883, filed Apr. 5, 2013, the entirety of which is hereby incorporated by reference.

BACKGROUND

Scalable video coding generally involves the generation of a video stream from which multiple versions of a same content item can be obtained, where the multiple versions differ according to one or more characteristics such as resolution, frame rate, signal-to-noise ratio (SNR), and/or bit depth. One approach to scalable video coding is embodied in the Annex G extension adopted in November 2007 for the H.264/MPEG-4 Part 10, Advanced Video Coding (AVC) standard jointly maintained by the Joint Video Team (JVT) partnership between the International Telecommunication Union Telecommunication Standardization Sector (ITU-T) Video Coding Experts Group (VCEG) and the International Organization for Standardization/International Electrotechnical Commission (ISO/IEC) JTC1 Moving Picture Experts Group (MPEG). A scalable video coding extension is also planned for the H.265/MPEG-H Part 2, High Efficiency Video Coding (HEVC) standard recently developed by the Joint Collaborative Team on Video Coding (JCT-VC) VCEG/MPEG partnership, which was formally published by the ISO/IEC on Nov. 25, 2013.

In a scalable video coding system, a multi-layered coding structure may be used that comprises a base layer and one or more enhancement layers. In the base layer, a base content version may be encoded. In each enhancement layer, a particular enhanced content version may be encoded that is enhanced with respect to one or more characteristics in comparison to the base content version. The encoding in any particular enhancement layer may be performed using predictions based on the base content version and/or using predictions based on one or more enhanced content versions associated with lower enhancement layers.

One technique that may be employed during encoding in any particular enhancement layer is inter-layer residual prediction. Inter-layer residual prediction may generally involve predicting residuals for blocks of a picture in an enhancement layer based on residuals for collocated blocks in a corresponding picture in the base layer or a lower enhancement layer. The use of inter-layer residual prediction may allow smaller, second-order residuals to be used in place of full residuals in generating an enhancement layer substream, and may thus enable a reduction in the bitrate associated with the enhancement layer substream. However, if a particular enhancement layer block has associated motion prediction characteristics that are inconsistent with those of the collocated lower-layer block, the residual for the collocated lower-layer block may not constitute a suitable basis for prediction of the residual for the enhancement layer, resulting in a large second-order residual and an incremental increase in the size of the enhancement layer substream.

BRIEF DESCRIPTION OF THE DRAWINGS

FIG. 5 illustrates one embodiment of a storage medium.

DETAILED DESCRIPTION

Various embodiments may be generally directed to techniques for inter-layer residual prediction. In one embodiment, for example, an apparatus may comprise an encoding component to determine whether a predicted motion for an enhancement layer block is consistent with a predicted motion for a collocated lower-layer block, determine whether to apply inter-layer residual prediction to the enhancement layer block based on whether the predicted motion for the enhancement layer block is consistent with the predicted motion for the collocated lower-layer block, and in response to a determination that inter-layer residual prediction is to be applied to the enhancement layer block, generate a predicted residual for the enhancement layer block based on a residual for the collocated lower-layer block and generate a second-order residual for the enhancement layer block by comparing a calculated residual to the predicted residual. Other embodiments are described and claimed.

Various embodiments may comprise one or more elements. An element may comprise any structure arranged to perform certain operations. Each element may be implemented as hardware, software, or any combination thereof, as desired for a given set of design parameters or performance constraints. Although an embodiment may be described with a limited number of elements in a certain topology by way of example, the embodiment may include more or less elements in alternate topologies as desired for a given implementation. It is worthy to note that any reference to "one embodiment" or "an embodiment" means that a particular feature, structure, or characteristic described in connection with the embodiment is included in at least one embodiment. The appearances of the phrases "in one embodiment," "in some embodiments," and "in various embodiments" in various places in the specification are not necessarily all referring to the same embodiment.

Figure 1:
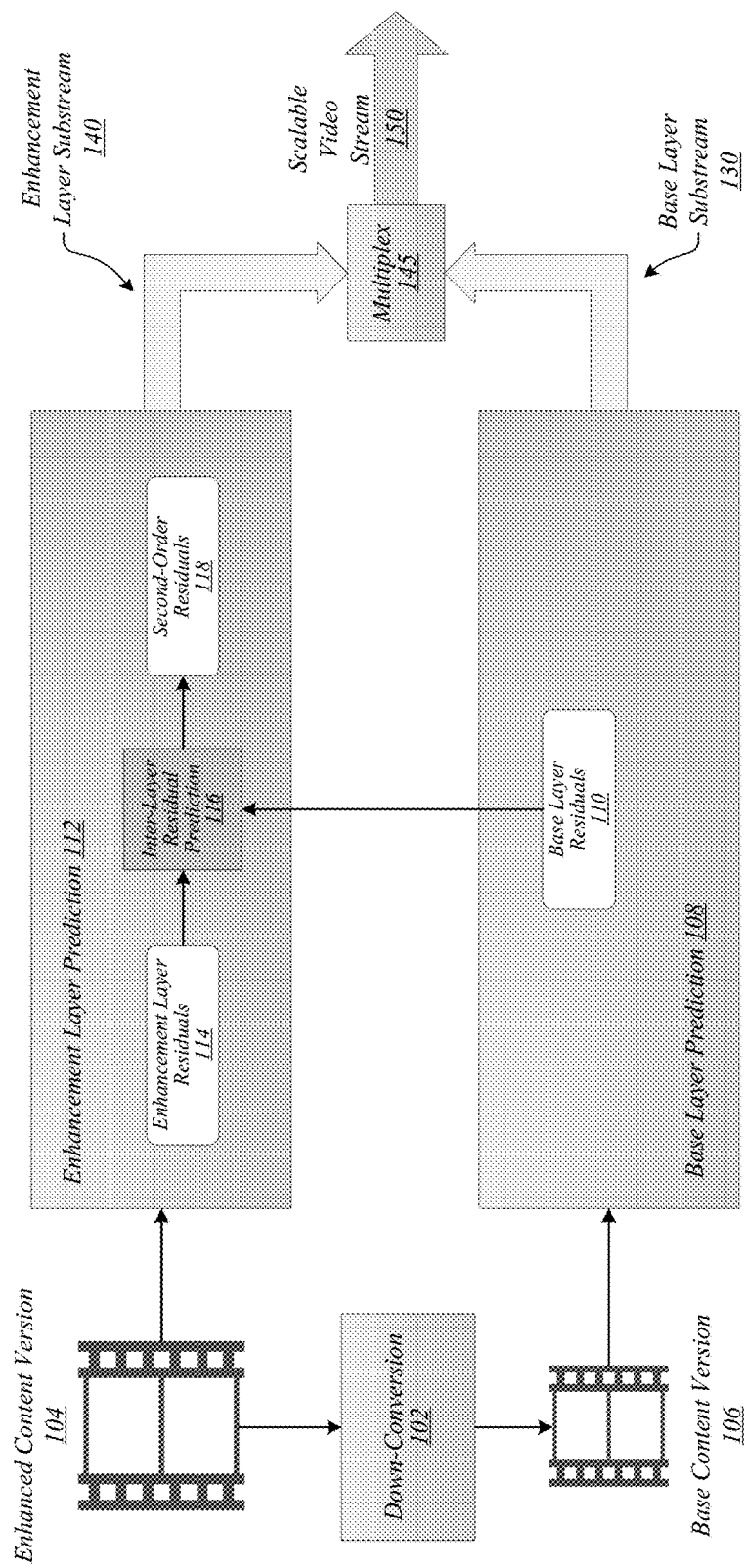
FIG. 1 illustrates one embodiment of a scalable video coding process.

FIG. 1 illustrates an example of a scalable video coding process 100 such as may be representative of various embodiments. More particularly, scalable video coding process 100 comprises a simple example of a scalable video coding process for generating a scalable video stream 150 that comprises a base layer substream 130 and a single enhancement layer substream 140 combined via a multiplexing operation 145. It is to be understood that the embodiments are not limited to this example, and some embodiments may involve scalable video streams comprising multiple enhancement layer substreams. The embodiments are not limited in this context.

As shown in FIG. 1, a down-conversion process 102 is applied to an enhanced content version 104 in order to obtain a base content version 106. Base content version 106 may comprise a version of a same content item as enhanced content version 104 that is downscaled with respect to one or more characteristics such as resolution, frame rate, or bit-depth. In an example embodiment, down-conversion process 102 may involve converting frames of enhanced content version 104 to a lower resolution in order to obtain base content version 106. In another example embodiment, down-conversion process 102 may involve down-sampling enhanced content version 104 in order to obtain base content version 106. The embodiments are not limited to these examples.

In various embodiments, a base layer prediction process 108 may be applied to base content version 106 in order to obtain base layer substream 130. Base layer prediction process 108 may comprise a portion of a video encoding process, such as an HEVC video coding process. Base layer substream 130 may comprise an encoded video stream that may be decoded by a recipient in order to view base content version 106. In some embodiments, base layer prediction process 108 may involve generating base layer residuals 110. For example, base layer prediction process 108 may comprise an HEVC video coding process featuring a predictive encoding portion during which base layer residuals 110 are generated. The embodiments are not limited to this example.

In various embodiments, an enhancement layer prediction process 112 may be applied to enhanced content version 104 in order to obtain enhancement layer substream 140. Enhancement layer prediction process 112 may comprise a portion of a scalable video coding process. For example, enhancement layer prediction process 112 may comprise a portion of a scalable HEVC (SHVC) coding process. Enhancement layer substream 140 may comprise an encoded video stream that may be decoded by a recipient, in combination with at least base layer substream 130, in order to view enhanced content version 104, which may comprise a version of a same content item as base content version 106 that is enhanced with respect to one or more characteristics. For example, enhanced content version 104 may comprise a higher-resolution version of a same content item as base content version 106. In some embodiments, enhancement layer prediction process 112 may involve generating enhancement layer residuals 114. In various embodiments, enhancement layer prediction process 112 may involve generating enhancement layer residuals 114 using a same video encoding process as that via which base layer residuals 110 are generated. For example, in some embodiments, enhancement layer residuals 114 may be obtained via HEVC video coding of enhanced content version 104. The embodiments are not limited in this context.

In various embodiments, enhancement layer prediction process 112 may comprise an inter-layer residual prediction process 116. Inter-layer residual prediction process 116 may involve applying a prediction model to predict enhancement layer residuals 114 based on base layer residuals 110, and generating second-order residuals 118 that describe differences between the predicted values and the actual values of enhancement layer residuals 114. In some embodiments, each second-order residual 118 may correspond to a particular block in a particular frame of enhanced content version 104, and may describe a difference between a predicted residual for that block and an actual enhancement layer residual 114 for that block. In various embodiments, quantized transforms of second-order residuals 118 may be included in enhancement layer substream 140 in lieu of quantized transforms of enhancement layer residuals 114. In some embodiments, second-order residuals 118 may comprise values of smaller magnitudes than enhancement layer residuals 114, and thus the use of quantized transforms of second-order residuals 118 in lieu of quantized transforms of enhancement layer residuals 114 may reduce the size of enhancement layer substream 140. The embodiments are not limited in this context.

It is worthy of note that although the example of FIG. 1 depicts inter-layer residual prediction 116 being performed based on a base content version processed in a base layer, the embodiments are not so limited. The techniques described herein may also be implemented in conjunction with inter-layer residual prediction that is performed in one enhancement layer based on an enhanced content version processed in a second, lower enhancement layer. It is also worthy of note that the term "block" as employed herein is used in a generic sense to generally refer to a region of a frame. Although a macroblock may comprise an example of a "block" in various embodiments, the term block is not intended to specifically denote a macroblock or any other particular defined unit. Additional examples of a block in some embodiments may include a coding unit (CU), prediction unit (PU), and a transform unit (TU). The embodiments are not limited to these examples.

For enhancement layer blocks featuring motion prediction characteristics that are inconsistent with those of their collocated base layer blocks, inter-layer residual prediction process 116 may calculate predicted residuals that differ substantially from the actual enhancement layer residuals 114 for those enhancement layer blocks. Although these discrepancies may be corrected via second-order residuals 118, the magnitudes of those second-order residuals 118 may tend to be large, resulting in the need to include more data in enhancement layer substream 140. For example, in embodiments in which second-order residuals 118 are transformed and quantized prior to inclusion in enhancement layer substream 140, the large magnitudes of such second-order residuals 118 may result in a greater number of non-zero quantized transform coefficients. As such, it may be desirable to perform inter-layer residual prediction 116 in conjunction with a motion-consistency constraint. According to such a constraint, for any given enhancement layer block, inter-layer residual prediction may be employed only with respect to collocated lower-layer blocks featuring motion prediction characteristics that are consistent with those of the enhancement layer block.

Figure 2:
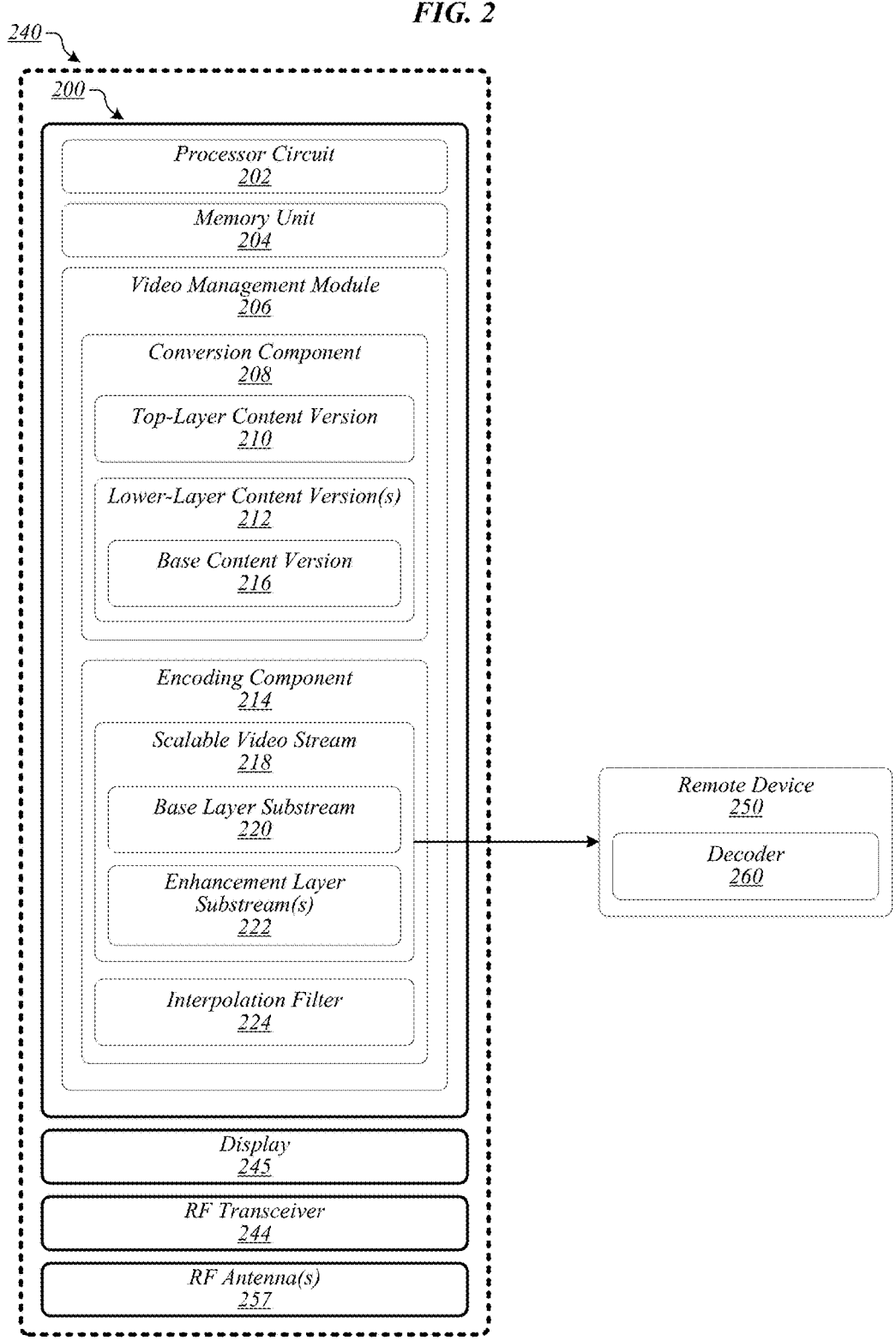
FIG. 2 illustrates one embodiment of an apparatus and one embodiment of a first system.

FIG. 2 illustrates a block diagram of an apparatus 200. Apparatus 200 comprises an example of an apparatus that may perform inter-layer residual prediction as part of a scalable video coding process such as scalable video coding process 100 of FIG. 1. More particularly, apparatus 200 may be operative in various embodiments to perform inter-layer residual prediction in conjunction with a motion-consistency constraint. As shown in FIG. 2, apparatus 200 comprises multiple elements including a processor circuit 202, a memory unit 204, and a graphics management module 206. The embodiments, however, are not limited to the type, number, or arrangement of elements shown in this figure.

In some embodiments, apparatus 200 may comprise processor circuit 202. Processor circuit 202 may be implemented using any processor or logic device, such as a complex instruction set computer (CISC) microprocessor, a reduced instruction set computing (RISC) microprocessor, a very long instruction word (VLIW) microprocessor, an x86 instruction set compatible processor, a processor implementing a combination of instruction sets, a multi-core processor such as a dual-core processor or dual-core mobile processor, or any other microprocessor or central processing unit (CPU). Processor circuit 202 may also be implemented as a dedicated processor, such as a controller, a microcontroller, an embedded processor, a chip multiprocessor (CMP), a co-processor, a digital signal processor (DSP), a network processor, a media processor, an input/output (I/O) processor, a media access control (MAC) processor, a radio baseband processor, an application specific integrated circuit (ASIC), a field programmable gate array (FPGA), a programmable logic device (PLD), and so forth. In one embodiment, for example, processor circuit 202 may be implemented as a general purpose processor, such as a processor made by Intel® Corporation, Santa Clara, Calif. The embodiments are not limited in this context.

In various embodiments, apparatus 200 may comprise or be arranged to communicatively couple with a memory unit 204. Memory unit 204 may be implemented using any machine-readable or computer-readable media capable of storing data, including both volatile and non-volatile memory. For example, memory unit 204 may include read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, or any other type of media suitable for storing information. It is worthy of note that some portion or all of memory unit 204 may be included on the same integrated circuit as processor circuit 202, or alternatively some portion or all of memory unit 204 may be disposed on an integrated circuit or other medium, for example a hard disk drive, that is external to the integrated circuit of processor circuit 202. Although memory unit 204 is comprised within apparatus 200 in FIG. 2, memory unit 204 may be external to apparatus 200 in some embodiments. The embodiments are not limited in this context.

In some embodiments, apparatus 200 may comprise a video management module 206. Video management module 206 may comprise logic, circuitry, and/or instructions operative to perform scalable video coding of video content. In various embodiments, video management module 206 may be operative to perform scalable video coding according to one or more video encoding and/or compression standards. For example, in some embodiments, video management module 206 may be operative to perform scalable video coding according to an HEVC Scalable Video Coding (SVC) extension. The embodiments are not limited in this context.

FIG. 2 also illustrates a block diagram of a system 240. System 240 may comprise any of the aforementioned elements of apparatus 200. System 240 may further comprise one or more additional components. For example, in various embodiments, system 240 may comprise a radio frequency (RF) transceiver 244. RF transceiver 244 may include one or more radios capable of transmitting and receiving signals using various suitable wireless communications techniques. Such techniques may involve communications across one or more wireless networks. Exemplary wireless networks include (but are not limited to) wireless local area networks (WLANs), wireless personal area networks (WPANs), wireless metropolitan area network (WMANs), cellular networks, and satellite networks. In communicating across such networks, RF transceiver 244 may operate in accordance with one or more applicable standards in any version. The embodiments are not limited in this context.

In some embodiments, system 240 may comprise one or more RF antennas 257. Examples of any particular RF antenna 257 may include an internal antenna, an omni-directional antenna, a monopole antenna, a dipole antenna, an end-fed antenna, a circularly polarized antenna, a micro-strip antenna, a diversity antenna, a dual antenna, a tri-band antenna, a quad-band antenna, and so forth. The embodiments are not limited to these examples.

In various embodiments, system 240 may include a display 245. Display 245 may comprise any display device capable of displaying information received from processor circuit 202. Examples for display 245 may include a television, a monitor, a projector, and a computer screen. In one embodiment, for example, display 245 may be implemented by a liquid crystal display (LCD), light emitting diode (LED) or other type of suitable visual interface. Display 245 may comprise, for example, a touch-sensitive display screen ("touchscreen"). In various implementations, display 245 may comprise one or more thin-film transistors (TFT) LCD including embedded transistors. The embodiments are not limited in this context.

In general operation, apparatus 200 and/or system 240 may be operative to encode video content using scalable video coding techniques, for transmission to one or more remote devices. In various embodiments, for example, apparatus 200 and/or system 240 may comprise a device used by a video content service provider to encode video content for transmission to one or more video content consumers. In various embodiments, apparatus 200 and/or system 240 may be operative to generate and transmit a scalable video stream that enables remote devices to select from among multiple versions of particular content. For example, in some embodiments, apparatus 200 and/or system 240 may be operative to generate a scalable video stream to enable video content consumers to select from among multiple resolutions for viewing a video content item. The embodiments are not limited to this example.

In various embodiments, video management module 206 may comprise a conversion component 208. Conversion component 208 may comprise logic, circuitry, and/or instructions operative to create multiple versions of video content items that differ with respect to one or more characteristics such as resolution, frame rate, SNR, and/or bit depth. In some embodiments, conversion component 208 may be operative to perform down-conversion operations on a top-layer content version 210 in order to generate one or more lower-layer content versions 212. Top-layer content version 210 may comprise a content item version to be encoded in a highest enhancement layer of a scalable video coding process, such as enhanced content version 104 of FIG. 1. Each lower-layer content version 212 may comprise a content item version that is downscaled, relative to top-layer content version 210, with respect to one or more characteristics such as resolution, frame rate, SNR, and/or bit depth. In various embodiments, some lower-layer content versions 212 may also constitute downscaled versions of other lower-layer content versions 212. For example, a first lower-layer content version 212 may feature a lower resolution than top-layer content version 210, and a second lower-layer content version 212 may feature that same lower resolution, and also a lower bit depth than the first lower-layer content version 212. The embodiments are not limited to this example.

In some embodiments, video management module 206 may comprise an encoding component 214. Encoding component 214 may comprise logic, circuitry, and/or instructions operative to encode top-layer content version 210 and lower-layer content version(s) 212 for transmission to one or more remote devices. In various embodiments, encoding component 214 may be operative to encode top-layer content version 210 and lower-layer content version(s) 212 according to one or more video encoding and/or compression standards. For example, in some embodiments, encoding component 214 may be operative to perform HEVC video encoding of top-layer content version 210 and lower-layer content version(s) 212. In various embodiments, encoding component 214 may be operative to perform scalable video coding of top-layer content version 210 and lower-layer content version(s) 212 according to one or more related standards. For example, in some embodiments, encoding component 214 may be operative to perform scalable video coding of top-layer content version 210 and lower-layer content version(s) 212 according to an HEVC Scalable Video Coding (SVC) extension. The embodiments are not limited in this context.

In various embodiments, encoding component 214 may be operative to identify a base content version 216 among the one or more lower-layer content versions 212. Base content version 216 may comprise a lower-layer content version 212 relative to which top-layer content version 210 and each other lower-layer content version 212 exhibits one or more enhanced characteristics and no downscaled characteristics. In some embodiments, base content version 216 may comprise a content item version to be encoded in a base layer of a scalable video coding process, such as base content version 106 of FIG. 1. In such embodiments top-layer content version 210 may comprise a content item version to be encoded in a highest enhancement layer of the scalable video coding process, and each lower-layer content version 212 other than base content version 216 may comprise a content item version to be encoded in an intermediate enhancement layer of the scalable video coding process. The embodiments are not limited in this context.

In various embodiments, encoding component 214 may be operative to a perform scalable video coding process in order to generate a scalable video stream 218. Scalable video stream 218 may comprise a video stream from which top-layer content version 210 and each lower-layer content version 212 can be obtained. In some embodiments, encoding component 214 may be operative to generate a base layer substream 220 and one or more enhancement layers substreams 222, and to combine them to form scalable video stream 218. Base layer substream 220 may be generated in a base layer of the scalable video coding process, may correspond to base content version 216, and may comprise an encoded video stream that may be decoded in order to obtain base content version 216. Each enhancement layer substream 222 may correspond to a respective content version other than base content version 216. More particularly, one enhancement layer substream 222 may correspond to top-layer content version 210, and each other enhancement layer substream 222 may correspond to a respective one of lower-layer content versions 212 other than base content version 216. Each enhancement layer substream 222 may be generated in a respective enhancement layer of the scalable video coding process, and may comprise an encoded video stream that may be decoded in combination with at least base layer substream 220 in order to obtain a corresponding content version. The embodiments are not limited in this context.

In various embodiments, during the generation of any particular enhancement layer substream 222, encoding component 214 may be operative to perform inter-layer residual prediction based on residuals associated with a content item encoded in a lower layer. For example, during generation of an enhancement layer substream 222 corresponding to top-layer content version 210, encoding component 214 may be operative to perform inter-layer residual prediction based on residuals associated with base content version 216 or any other lower-layer content version 212. In another example, during generation of an enhancement layer substream 222 corresponding to a particular lower-layer content version 212, encoding component 214 may be operative to perform inter-layer residual prediction based on residuals associated with base content version 216 or any other lower-layer content version 212 that corresponds to a lower enhancement layer than the particular lower-layer content version 212 being encoded. The embodiments are not limited to these examples.

In some embodiments, encoding component 214 may be operative to apply a motion-consistency constraint while performing inter-layer residual prediction. According to such a constraint, during encoding of a content version in a particular enhancement layer based on a content version of a lower layer, inter-layer residual prediction may be employed only with respect to collocated blocks featuring consistent motion prediction characteristics. In various embodiments, the scalable video coding performed in any particular enhancement layer may comprise a predictive encoding process according to which encoding component 214 performs predictive encoding for each of a plurality of blocks in each of a plurality of frames of a content version associated with that enhancement layer. In some embodiments, encoding component 214 may be operative to apply the motion-consistency constraint when encoding each respective such enhancement layer block. The embodiments are not limited in this context.

In various embodiments, for any particular enhancement layer block that it encodes, encoding component 214 may be operative to determine a collocated lower-layer block. In some embodiments, the collocated lower-layer block may comprise a region in a frame of a lower-layer content version 212 based upon which a content version comprising the enhancement layer block is encoded. In such cases, the lower-layer frame may correspond in time to the enhancement layer frame that comprises the enhancement layer block. For example, the lower-layer frame and the enhancement layer frame may be associated with a same time index. In various embodiments, the collocated lower-layer block may comprise a region in the lower-layer frame that corresponds to the region occupied by the enhancement layer block within the enhancement layer frame. In some such embodiments, if the resolutions and aspect ratios of the two content versions are the same, the collocated lower-layer block may occupy the same pixel coordinates within the lower-layer frame as the enhancement layer block occupies within the enhancement layer frame. On the other hand, if the resolutions and/or aspect ratios of the two content versions are different, the collocated lower-layer block may occupy pixel coordinates that are different than but equivalent to those occupied by the enhancement layer block in the enhancement layer frame.

It is worthy of note that in some cases, there may not be a single lower-layer frame that corresponds in time to the enhancement layer frame that comprises the enhancement layer block. For example, in various embodiments, the lower-layer content version 212 may comprise a lower frame rate than the content version comprising the enhancement layer frame. In some such embodiments, inter-layer residual prediction for the enhancement layer frame may be performed based on a composite lower-layer frame that corresponds in time to the enhancement layer frame and that comprises an interpolation of multiple lower-layer frames. In various such embodiments, the collocated lower-layer block may comprise a region in the composite lower-layer frame that corresponds to the region occupied by the enhancement layer block within the enhancement layer frame. Depending on whether the resolutions and aspect ratios of the two content versions are the same, the collocated lower-layer block may occupy the same pixel coordinates as the enhancement layer block or may occupy different but equivalent pixel coordinates as the enhancement layer block. The embodiments are not limited in this context.

In some embodiments, one it has identified the collocated lower-layer block, encoding component 214 may be operative to determine whether the predicted motion for the enhancement layer block is consistent with the predicted motion for the collocated lower-layer block. In various embodiments, encoding component 214 may be operative to perform this determination using a motion-consistency determination process, such as is discussed in detail below with respect to FIG. 4. The embodiments are not limited in this context.

In some embodiments, encoding component 214 may be operative to determine whether to apply inter-layer residual prediction to the enhancement layer block based on whether the predicted motion for the enhancement layer block is consistent with the predicted motion for the collocated lower-layer block. In various embodiments, encoding component 214 may be operative to automatically use inter-layer residual prediction for each block that it determines to have consistent motion parameters with its collocated lower-layer block. In such embodiments, encoding component 214 may be operative to determine whether to apply inter-layer residual prediction to the enhancement layer block based exclusively on whether the predicted motion for the enhancement layer block is consistent with the predicted motion for the collocated lower-layer block.

In some other embodiments, however, encoding component 214 may be operative to adaptively apply or not apply inter-layer residual prediction on a block by block basis, in view of one or more other criteria. In such embodiments, encoding component 214 may be operative to determine whether to apply inter-layer residual prediction to the enhancement layer block based on one or more such criteria in addition to on whether the predicted motion for the enhancement layer block is consistent with the predicted motion for the collocated lower-layer block. For example, in various embodiments, encoding component 214 may be operative to estimate, for each block, a respective rate-distortion cost associated with the application of inter-layer residual prediction to that block. In some embodiments, encoding component 214 may be operative to determine not to apply inter-layer residual prediction to blocks for which the associated rate-distortion cost exceeds a threshold. In such embodiments, encoding component 214 may be operative to determine whether to apply inter-layer residual prediction to the enhancement layer block based on whether the predicted motion for the enhancement layer block is consistent with the predicted motion for the collocated lower-layer block and on whether the estimated rate-distortion cost exceeds the threshold. The embodiments are not limited to this example.

In various embodiments, for any particular enhancement layer frame, encoding component 214 may be operative to generate a set of flag values, each indicating whether inter-layer residual prediction has been applied to a respective block in that frame. In some embodiments, encoding component 214 may be operative to include such flag values in scalable video stream 218, such that they are available for reference during decoding of the substream for the corresponding enhancement layer. The embodiments are not limited in this context.

In various embodiments, for any particular enhancement layer block to which it applies inter-layer residual prediction, encoding component 214 may be operative to determine a predicted residual based on a residual for a collocated lower-layer block. Encoding component 214 may then be operative to generate a second-order residual for the enhancement layer block by comparing the predicted residual to a calculated residual for the enhancement layer block. In some embodiments, the second-order residual may comprise a value that can be used to determine the calculated residual based on the predicted residual. In various embodiments, the second-order residual may comprise a difference between the calculated residual and the predicted residual. The embodiments are not limited in this context.

In some embodiments, encoding component 214 may be operative to determine whether the spatial resolution of the enhancement layer content version is greater than the spatial resolution of the lower-layer content version. In various embodiments, encoding component 214 may be operative to directly predict the enhancement layer residual based on the lower-layer residual when the spatial resolution of the enhancement layer content version is not greater than the spatial resolution of the lower-layer content version. In some embodiments, when the spatial resolution of the enhancement layer content version is greater than that of the lower-layer content version, encoding component 214 may be operative to upsample the lower-layer content version in order to obtain an upsampled residual for the collocated lower-layer block. In various such embodiments, encoding component 214 may then be operative to generate the predicted residual for the enhancement layer block based on the upsampled residual for the collocated lower-layer block. In some embodiments, encoding component 214 may be operative to obtain the upsampled residual for the collocated lower-layer block by applying an interpolation filter 224. In various embodiments, the interpolation filter 224 may comprised a fixed poly-phase interpolation filter. In some other embodiments, the interpolation filter 224 may comprise an adaptive interpolation filter. The embodiments are not limited to these examples.

In various embodiments, encoding component 214 may be operative to generate a scalable video stream 218 comprising a base layer substream 220 corresponding to base content version 216 and a respective enhancement layer substream 222 corresponding to each enhanced content version. In some embodiments, encoding component 214 may be operative to include in each enhancement layer substream 222 any second-order residuals generated by application of inter-layer residual prediction during encoding of the corresponding enhanced content version. In various embodiments, encoding component 214 may be operative to transform and quantize the second-order residuals, and to include the quantized transformed second-order residuals in the enhancement layer substream 222. The embodiments are not limited in this context.

In various embodiments, apparatus 200 and/or system 240 may be operative to send the scalable video stream 218 to a remote device 250. For example, in some embodiments, apparatus 200 and/or system 240 may be operative to transmit scalable video stream 218 to remote device 250 using RF transceiver 244 and one or more RF antennas 257. In various embodiments, remote device 250 may comprise a decoder 260. Decoder 260 may comprise logic, circuitry, and/or instructions operative to decode video that has been encoded according to the video encoding process used by encoding component 214. For example, in some embodiments, decoder 260 may comprise an HEVC decoder configured with SVC decoding capabilities. In various embodiments, the second-order residuals included in any particular enhancement layer substream 222 may enable decoder 260 to obtain close approximations of the actual residuals for the enhancement layer blocks to which those second-order residuals correspond. For example, in some embodiments, decoder 260 may be operative to generate predicted residuals using the same the inter-layer residual prediction scheme employed by encoding component 214, and to add the second-order residuals to the predicted residuals in order to obtain close approximations of the actual residuals for the associated enhancement layer blocks. The embodiments are not limited in this context.

Operations for the above embodiments may be further described with reference to the following figures and accompanying examples. Some of the figures may include a logic flow. Although such figures presented herein may include a particular logic flow, it can be appreciated that the logic flow merely provides an example of how the general functionality as described herein can be implemented. Further, the given logic flow does not necessarily have to be executed in the order presented unless otherwise indicated. In addition, the given logic flow may be implemented by a hardware element, a software element executed by a processor, or any combination thereof. The embodiments are not limited in this context.

Figure 3:
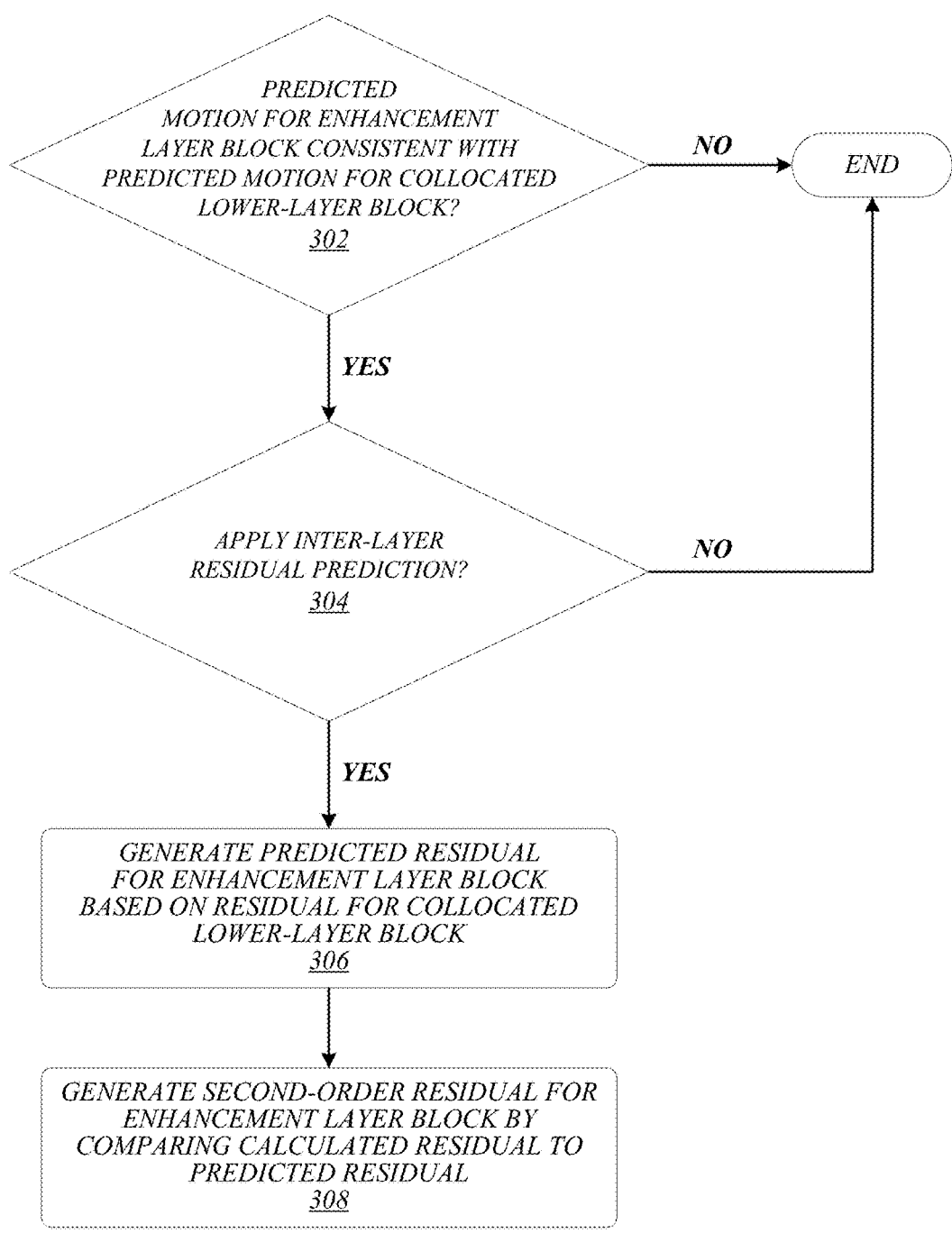
FIG. 3 illustrates one embodiment of a first logic flow.

FIG. 3 illustrates one embodiment of a logic flow 300, which may be representative of the operations executed by one or more embodiments described herein. More particularly, logic flow 300 may be representative of operations such as may be executed by apparatus 200 and/or system 240 of FIG. 2 in various embodiments. As shown in logic flow 300, it may be determined whether a predicted motion for an enhancement layer block is consistent with a predicted motion for a collocated lower-layer block at 302. For example, encoding component 214 of FIG. 2 may be operative to determine whether a predicted motion for an enhancement layer block is consistent with a predicted motion for a collocated lower-layer block. In some embodiments, the collocated lower-layer block may comprise a block in a base content version or may comprise a block in an enhanced content version associated with a lower enhancement layer than that of the enhancement layer block. In various embodiments, the determination of whether the predicted motion for the enhancement layer block is consistent with the predicted motion for the collocated lower-layer block may be performed using a motion-consistency determination process, such as is discussed in detail below with respect to FIG. 4. If it is determined at 302 that the predicted motion for the enhancement layer block is not consistent with the predicted motion for the collocated lower-layer block, the logic flow may end. If it is determined that the predicted motion for the enhancement layer block is consistent with the predicted motion for the collocated lower-layer block, flow may pass to 304.

At 304, it may be determined whether to apply inter-layer residual prediction to the enhancement layer block. For example, encoding component 214 of FIG. 2 may be operative to determine whether to apply inter-layer residual prediction to the enhancement layer block In some embodiments, this determination may be based exclusively on whether the predicted motion for the enhancement layer block is consistent with the predicted motion for the collocated lower-layer block. In such embodiments, since the predicted motion for the enhancement layer block must be consistent with the predicted motion for the collocated lower-layer block in order for flow to reach 304, flow may pass automatically from 304 to 306. In various other embodiments, the determination of whether to apply inter-layer residual prediction to the enhancement layer block may be additionally based on one or more other criteria. For example, in some embodiments, the determination of whether to apply inter-layer residual prediction to the enhancement layer block may be additionally based on whether an associated rate-distortion cost exceeds a threshold. In such embodiments, the one or more other criteria may be applied at 304 in order to determine whether to apply inter-layer residual prediction to the enhancement layer block. If it is determined that inter-layer residual prediction is not to be applied to the enhancement layer block, the logic flow may end. If it is determined that inter-layer residual prediction is to be applied to the enhancement layer block, flow may pass to 306.

At 306, a predicted residual for the enhancement layer block may be generated based on a residual for the collocated lower-layer block. For example, encoding component 214 of FIG. 2 may be operative to generated a predicted residual for the enhancement layer block based on a residual for the collocated lower-layer block. In various embodiments, when a spatial resolution for an enhancement layer associated with the enhancement layer block is greater than a spatial resolution for a lower layer associated with the collocated lower-layer block, an upsampling filter may be applied in order to obtain an upsampled residual for the collocated lower-layer block, and the predicted residual for the enhancement layer block may be generated based on the upsampled residual for the collocated lower-layer block. For example, encoding component 214 of FIG. 2 may be operative to apply interpolation filter 224 in order to obtain an upsampled residual for the collocated lower-layer block, and may then generate the predicted residual for the enhancement layer block may be generated based on the upsampled residual for the collocated lower-layer block.

At 308, a second-order residual may be generated for the enhancement layer block by comparing a calculated residual for the enhancement layer block to the predicted residual for the enhancement layer block. For example, encoding component 214 of FIG. 2 may be operative to generate a second-order residual for the enhancement layer block by comparing the predicted residual for the enhancement layer block to a residual that was calculated for the enhancement layer block during HEVC encoding of an enhanced content version comprising the enhancement layer block. In some embodiments, the second-order residual for the enhancement layer block may comprise a difference between the predicted residual for the enhancement layer block and the calculated residual for the enhancement layer block. The embodiments are not limited to these examples.

Figure 4:
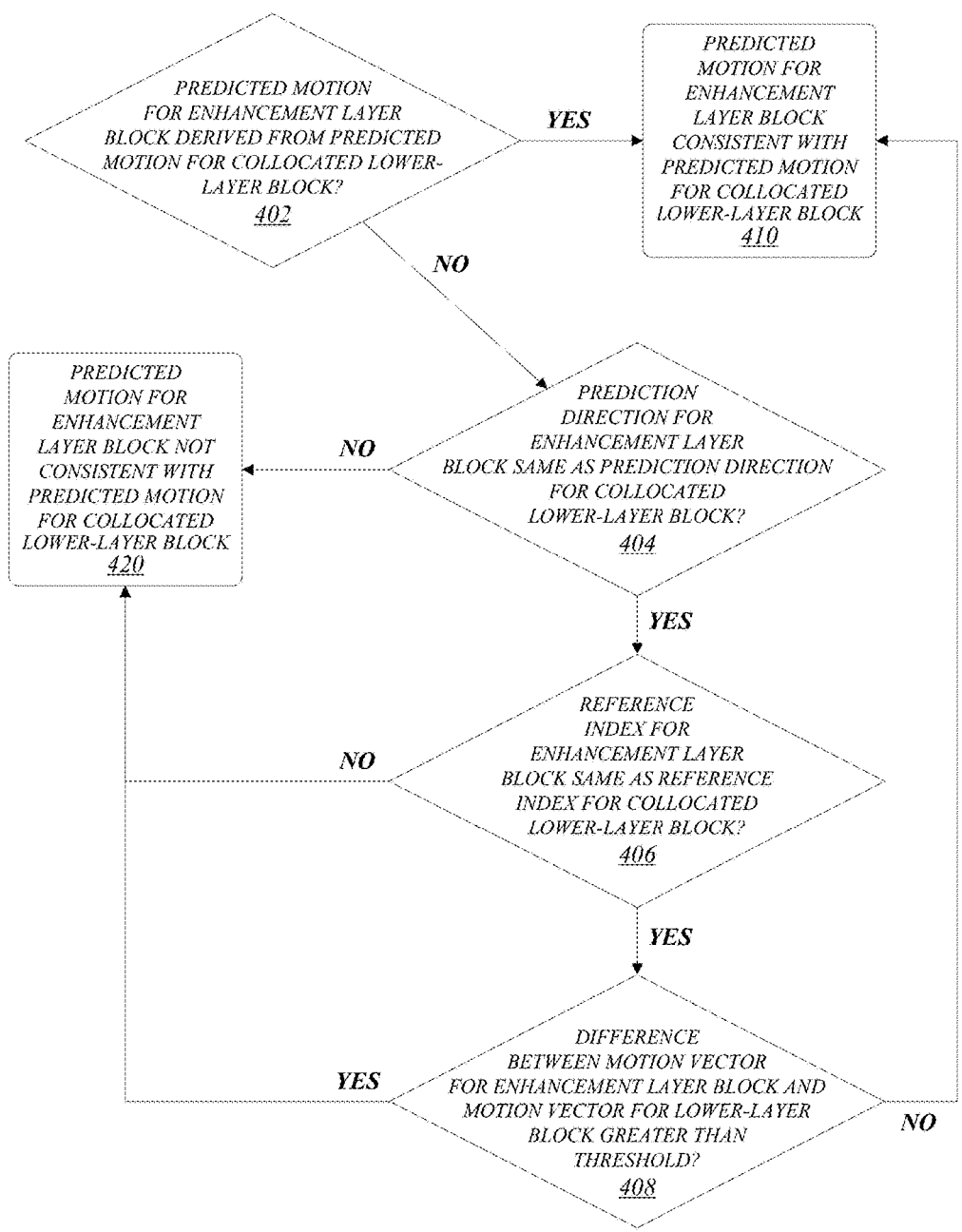
FIG. 4 illustrates one embodiment of a second logic flow.

FIG. 4 illustrates one embodiment of a logic flow 400, which may be representative of the operations executed by one or more embodiments described herein. More particularly, logic flow 400 may be representative of operations such as may be executed by apparatus 200 and/or system 240 of FIG. 2 in various embodiments in order to determine whether a predicted motion for an enhancement layer block is consistent with a predicted motion for a collocated lower-layer block.

It is worthy of note that under some circumstances, the predicted motion for a particular enhancement layer block may be predicted based on the predicted motion for its collocated lower-layer block, using inter-layer motion prediction. For example, the enhancement layer block may use an inter-layer motion candidate that is associated with the collocated lower-layer block and that was selected from an enhancement layer inter-prediction merge list. In another example, the enhancement layer block may use a motion data inheritance mode according to which motion data for the enhancement layer block is derived from motion data for the collocated lower-layer block.

In order to account for such possibilities, it may be determined whether the predicted motion for the enhancement layer block is derived from the predicted motion for the collocated lower-layer block at 402. For example, encoding component 214 of FIG. 2 may be operative to determine whether the predicted motion for the enhancement layer block uses an inter-layer motion candidate that is associated with the collocated lower-layer block and that was selected from an enhancement layer inter-prediction merge list, and/or whether the enhancement layer block uses a motion data inheritance mode according to which motion data for the enhancement layer block is derived from motion data for the collocated lower-layer block. If the predicted motion for the enhancement layer block is derived from the predicted motion for the collocated lower-layer block, the motion-consistency constraint may be inherently fulfilled. As such, if it is determined at 402 that the predicted motion for the enhancement layer block is derived from the predicted motion for the collocated lower-layer block, flow may pass directly to 410, where it may be determined that the predicted motion for the enhancement layer block is consistent with the predicted motion for the collocated lower-layer block. If it is determined at 402 that the predicted motion for the enhancement layer block is not derived from the predicted motion for the collocated lower-layer block, flow may pass to 404.

At 404, it may be determined whether the prediction direction for the enhancement layer block is the same as the prediction direction for the collocated lower-layer block. For example, if the motion data for the enhancement layer block is forward-predicted, encoding component 214 of FIG. 2 may be operative to determine whether the motion data for the collocated lower-layer block is also forward-predicted. If it is determined that the prediction direction for the enhancement layer block is not the same as the prediction direction for the collocated lower-layer block, flow may pass to 420, where it may be determined that the predicted motion for the enhancement layer block is not consistent with the predicted motion for the collocated lower-layer block. If it is determined at 404 that the prediction direction for the enhancement layer block is the same as the prediction direction for the collocated lower-layer block, flow may pass to 406.

At 406, it may be determined whether the reference index for the enhancement layer block motion prediction is the same as the reference index for the collocated lower-layer block motion prediction. For example, encoding component 214 of FIG. 2 may be operative to determine whether the enhancement layer block motion prediction is based on a same reference index as that of the collocated lower-layer block. If it is determined that the reference index for the enhancement layer block motion prediction is not the same as the reference index for the collocated lower-layer block motion prediction, flow may pass to 420, where it may be determined that the predicted motion for the enhancement layer block is not consistent with the predicted motion for the collocated lower-layer block. If it is determined at 406 that the reference index for the enhancement layer block motion prediction is the same as the reference index for the collocated lower-layer block motion prediction, flow may pass to 408.

At 408, it may be determined whether a difference between a motion vector for the enhancement layer block and a motion vector for the lower-layer block is greater than a threshold. For example, encoding component 214 of FIG. 2 may be operative to determine whether the difference between the motion vector for the enhancement layer block and the motion vector for the lower-layer block is greater than a threshold. In some embodiments, the difference between the two motion vectors may be computed as the norm of the vector difference between the two vectors. If it is determined that the difference between the motion vector for the enhancement layer block and the motion vector for the lower-layer block is greater than the threshold, flow may pass to 420, where it may be determined that the predicted motion for the enhancement layer block is not consistent with the predicted motion for the collocated lower-layer block. If it is determined that the difference between the motion vector for the enhancement layer block and the motion vector for the lower-layer block is not greater than the threshold, flow may pass to 410, where it may be determined that the predicted motion for the enhancement layer block is consistent with the predicted motion for the collocated lower-layer block. In various embodiments, the threshold may comprise a value of zero, such that it will be determined that the predicted motion for the enhancement layer block is not consistent with the predicted motion for the collocated lower-layer block unless the two motion vectors are the same. In some other embodiments, the threshold may comprise a positive value selected based on training data or other information. The embodiments are not limited in this context.

It is worthy of note that in various embodiments, the motion vector for the collocated lower-layer block may be adjusted prior to the determination at 408. More particularly, in some embodiments, the motion vector for the collocated lower-layer block may be scaled based on a difference between an aspect ratio of its corresponding content version and an aspect ratio of a content version corresponding to the enhancement layer block. In such embodiments, the determination at 408 may then be performed by comparing the motion vector for the enhancement layer block to the scaled motion vector for the lower-layer block. The embodiments are not limited in this context.

FIG. 5 illustrates an embodiment of a storage medium 500. Storage medium 500 may comprise any non-transitory computer-readable storage medium or machine-readable storage medium, such as an optical, magnetic or semiconductor storage medium. In various embodiments, storage medium 500 may comprise an article of manufacture. In some embodiments, storage medium 500 may store computer-executable instructions, such as computer-executable instructions to implement logic flow 300 of FIG. 3 and/or logic flow 400 of FIG. 4. Examples of a computer-readable storage medium or machine-readable storage medium may include any tangible media capable of storing electronic data, including volatile memory or non-volatile memory, removable or non-removable memory, erasable or non-erasable memory, writeable or re-writeable memory, and so forth. Examples of computer-executable instructions may include any suitable type of code, such as source code, compiled code, interpreted code, executable code, static code, dynamic code, object-oriented code, visual code, and the like. The embodiments are not limited in this context.

Figure 6:
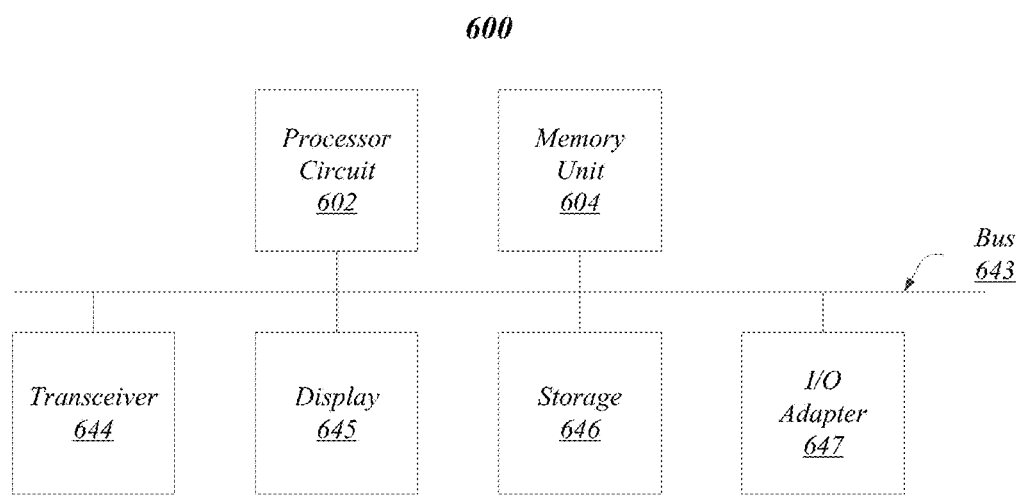
FIG. 6 illustrates one embodiment of a second system.

FIG. 6 illustrates one embodiment of a system 600. In various embodiments, system 600 may be representative of a system or architecture suitable for use with one or more embodiments described herein, such as apparatus 200 and/or system 240 of FIG. 2, logic flow 300 of FIG. 3, logic flow 400 of FIG. 4, and/or storage medium 500 of FIG. 5. The embodiments are not limited in this respect.

As shown in FIG. 6, system 600 may include multiple elements. One or more elements may be implemented using one or more circuits, components, registers, processors, software subroutines, modules, or any combination thereof, as desired for a given set of design or performance constraints. Although FIG. 6 shows a limited number of elements in a certain topology by way of example, it can be appreciated that more or less elements in any suitable topology may be used in system 600 as desired for a given implementation. The embodiments are not limited in this context.

In various embodiments, system 600 may include a processor circuit 602. Processor circuit 602 may be implemented using any processor or logic device, and may be the same as or similar to processor circuit 202 of FIG. 2.

In one embodiment, system 600 may include a memory unit 604 to couple to processor circuit 602. Memory unit 604 may be coupled to processor circuit 602 via communications bus 643, or by a dedicated communications bus between processor circuit 602 and memory unit 604, as desired for a given implementation. Memory unit 604 may be implemented using any machine-readable or computer-readable media capable of storing data, including both volatile and non-volatile memory, and may be the same as or similar to memory unit 204 of FIG. 2. In some embodiments, the machine-readable or computer-readable medium may include a non-transitory medium. The embodiments are not limited in this context.

In various embodiments, system 600 may include an RF transceiver 644. RF transceiver 644 may include one or more radios capable of transmitting and receiving signals using various suitable wireless communications techniques, and may be the same as or similar to RF transceiver 244 of FIG. 2.

In various embodiments, system 600 may include a display 645. Display 645 may comprise any display device capable of displaying information received from processor circuit 602, and may be the same as or similar to display 245 of FIG. 2. The embodiments are not limited in this context.

In various embodiments, system 600 may include storage 646. Storage 646 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In embodiments, storage 646 may include technology to increase the storage performance enhanced protection for valuable digital media when multiple hard drives are included, for example. Further examples of storage 646 may include a hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of DVD devices, a tape device, a cassette device, or the like. The embodiments are not limited in this context.

In various embodiments, system 600 may include one or more I/O adapters 647. Examples of I/O adapters 647 may include Universal Serial Bus (USB) ports/adapters, IEEE 1394 Firewire ports/adapters, and so forth. The embodiments are not limited in this context.

Figure 7:
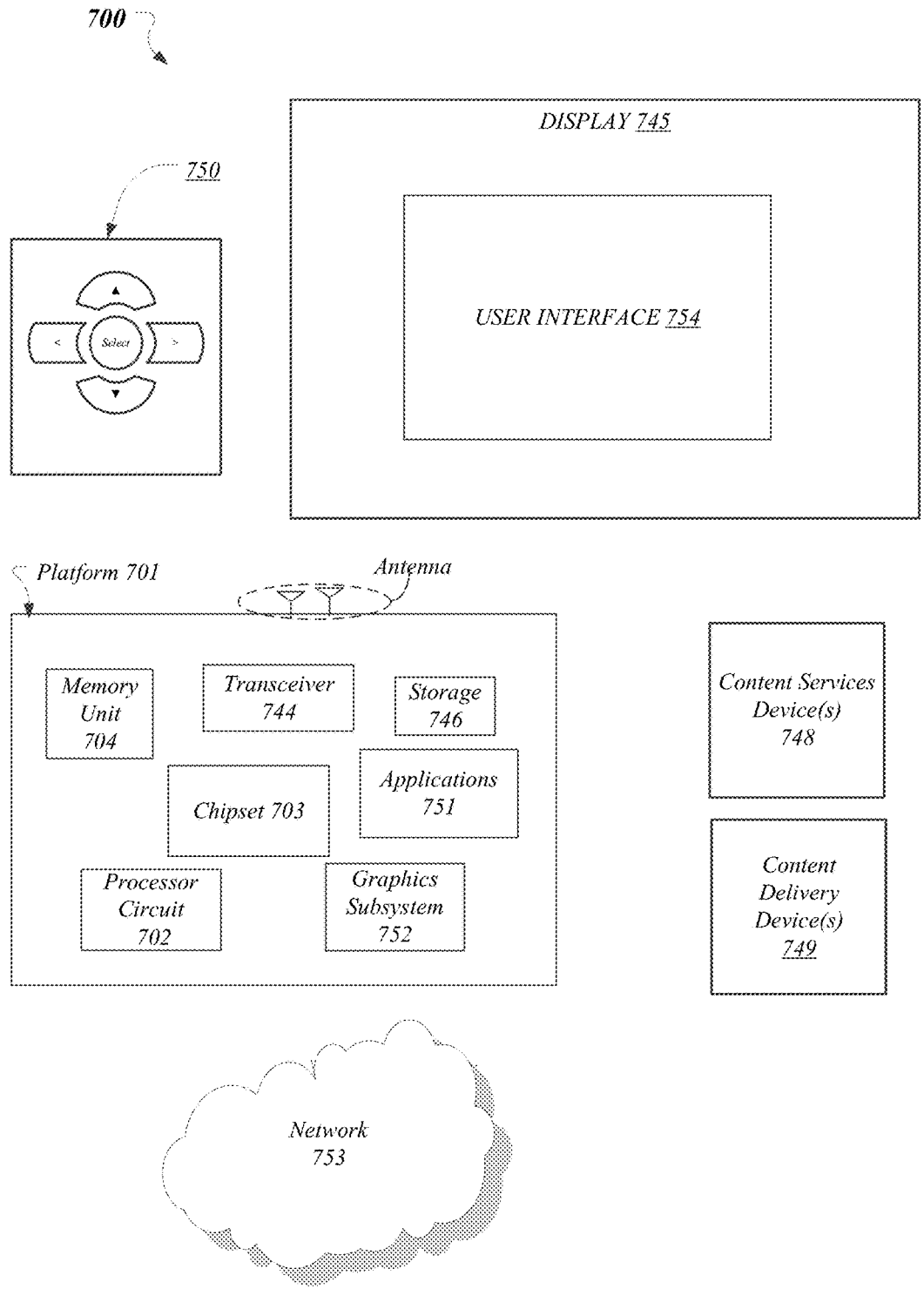
FIG. 7 illustrates one embodiment of a third system.

FIG. 7 illustrates an embodiment of a system 700. In various embodiments, system 700 may be representative of a system or architecture suitable for use with one or more embodiments described herein, such as apparatus 200 and/or system 240 of FIG. 2, logic flow 300 of FIG. 3, logic flow 400 of FIG. 4, storage medium 500 of FIG. 5, and/or system 600 of FIG. 6. The embodiments are not limited in this respect.

As shown in FIG. 7, system 700 may include multiple elements. One or more elements may be implemented using one or more circuits, components, registers, processors, software subroutines, modules, or any combination thereof, as desired for a given set of design or performance constraints. Although FIG. 7 shows a limited number of elements in a certain topology by way of example, it can be appreciated that more or less elements in any suitable topology may be used in system 700 as desired for a given implementation. The embodiments are not limited in this context.

In embodiments, system 700 may be a media system although system 700 is not limited to this context. For example, system 700 may be incorporated into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

In embodiments, system 700 includes a platform 701 coupled to a display 745. Platform 701 may receive content from a content device such as content services device(s) 748 or content delivery device(s) 749 or other similar content sources. A navigation controller 750 including one or more navigation features may be used to interact with, for example, platform 701 and/or display 745. Each of these components is described in more detail below.

In embodiments, platform 701 may include any combination of a processor circuit 702, chipset 703, memory unit 704, transceiver 744, storage 746, applications 751, and/or graphics subsystem 752. Chipset 703 may provide intercommunication among processor circuit 702, memory unit 704, transceiver 744, storage 746, applications 751, and/or graphics subsystem 752. For example, chipset 703 may include a storage adapter (not depicted) capable of providing intercommunication with storage 746.

Processor circuit 702 may be implemented using any processor or logic device, and may be the same as or similar to processor circuit 602 in FIG. 6.

Memory unit 704 may be implemented using any machine-readable or computer-readable media capable of storing data, and may be the same as or similar to memory unit 604 in FIG. 6.

Transceiver 744 may include one or more radios capable of transmitting and receiving signals using various suitable wireless communications techniques, and may be the same as or similar to transceiver 644 in FIG. 6.

Display 745 may include any television type monitor or display, and may be the same as or similar to display 645 in FIG. 6.

Storage 746 may be implemented as a non-volatile storage device, and may be the same as or similar to storage 646 in FIG. 6.

Graphics subsystem 752 may perform processing of images such as still or video for display. Graphics subsystem 752 may be a graphics processing unit (GPU) or a visual processing unit (VPU), for example. An analog or digital interface may be used to communicatively couple graphics subsystem 752 and display 745. For example, the interface may be any of a High-Definition Multimedia Interface, DisplayPort, wireless HDMI, and/or wireless HD compliant techniques. Graphics subsystem 752 could be integrated into processor circuit 702 or chipset 703. Graphics subsystem 752 could be a stand-alone card communicatively coupled to chipset 703.

The graphics and/or video processing techniques described herein may be implemented in various hardware architectures. For example, graphics and/or video functionality may be integrated within a chipset. Alternatively, a discrete graphics and/or video processor may be used. As still another embodiment, the graphics and/or video functions may be implemented by a general purpose processor, including a multi-core processor. In a further embodiment, the functions may be implemented in a consumer electronics device.

In embodiments, content services device(s) 748 may be hosted by any national, international and/or independent service and thus accessible to platform 701 via the Internet, for example. Content services device(s) 748 may be coupled to platform 701 and/or to display 745. Platform 701 and/or content services device(s) 748 may be coupled to a network 753 to communicate (e.g., send and/or receive) media information to and from network 753. Content delivery device(s) 749 also may be coupled to platform 701 and/or to display 745.

In embodiments, content services device(s) 748 may include a cable television box, personal computer, network, telephone, Internet enabled devices or appliance capable of delivering digital information and/or content, and any other similar device capable of unidirectionally or bidirectionally communicating content between content providers and platform 701 and/display 745, via network 753 or directly. It will be appreciated that the content may be communicated unidirectionally and/or bidirectionally to and from any one of the components in system 700 and a content provider via network 753. Examples of content may include any media information including, for example, video, music, medical and gaming information, and so forth.

Content services device(s) 748 receives content such as cable television programming including media information, digital information, and/or other content. Examples of content providers may include any cable or satellite television or radio or Internet content providers. The provided examples are not meant to limit embodiments of the disclosed subject matter.

In embodiments, platform 701 may receive control signals from navigation controller 750 having one or more navigation features. The navigation features of navigation controller 750 may be used to interact with a user interface 754, for example. In embodiments, navigation controller 750 may be a pointing device that may be a computer hardware component (specifically human interface device) that allows a user to input spatial (e.g., continuous and multi-dimensional) data into a computer. Many systems such as graphical user interfaces (GUI), and televisions and monitors allow the user to control and provide data to the computer or television using physical gestures or sounds.

Movements of the navigation features of navigation controller 750 may be echoed on a display (e.g., display 745) by movements of a pointer, cursor, focus ring, or other visual indicators displayed on the display. For example, under the control of software applications 751, the navigation features located on navigation controller 750 may be mapped to virtual navigation features displayed on user interface 754. In embodiments, navigation controller 750 may not be a separate component but integrated into platform 701 and/or display 745. Embodiments, however, are not limited to the elements or in the context shown or described herein.

In embodiments, drivers (not shown) may include technology to enable users to instantly turn on and off platform 701 like a television with the touch of a button after initial boot-up, when enabled, for example. Program logic may allow platform 701 to stream content to media adaptors or other content services device(s) 748 or content delivery device(s) 749 when the platform is turned "off." In addition, chip set 703 may include hardware and/or software support for 5.1 surround sound audio and/or high definition 7.1 surround sound audio, for example. Drivers may include a graphics driver for integrated graphics platforms. In embodiments, the graphics driver may include a peripheral component interconnect (PCI) Express graphics card.

In various embodiments, any one or more of the components shown in system 700 may be integrated. For example, platform 701 and content services device(s) 748 may be integrated, or platform 701 and content delivery device(s) 749 may be integrated, or platform 701, content services device(s) 748, and content delivery device(s) 749 may be integrated, for example. In various embodiments, platform 701 and display 745 may be an integrated unit. Display 745 and content service device(s) 748 may be integrated, or display 745 and content delivery device(s) 749 may be integrated, for example. These examples are not meant to limit the disclosed subject matter.

In various embodiments, system 700 may be implemented as a wireless system, a wired system, or a combination of both. When implemented as a wireless system, system 700 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 700 may include components and interfaces suitable for communicating over wired communications media, such as I/O adapters, physical connectors to connect the I/O adapter with a corresponding wired communications medium, a network interface card (NIC), disc controller, video controller, audio controller, and so forth. Examples of wired communications media may include a wire, cable, metal leads, printed circuit board (PCB), backplane, switch fabric, semiconductor material, twisted-pair wire, co-axial cable, fiber optics, and so forth.

Platform 701 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The embodiments, however, are not limited to the elements or in the context shown or described in FIG. 7.

Figure 8:
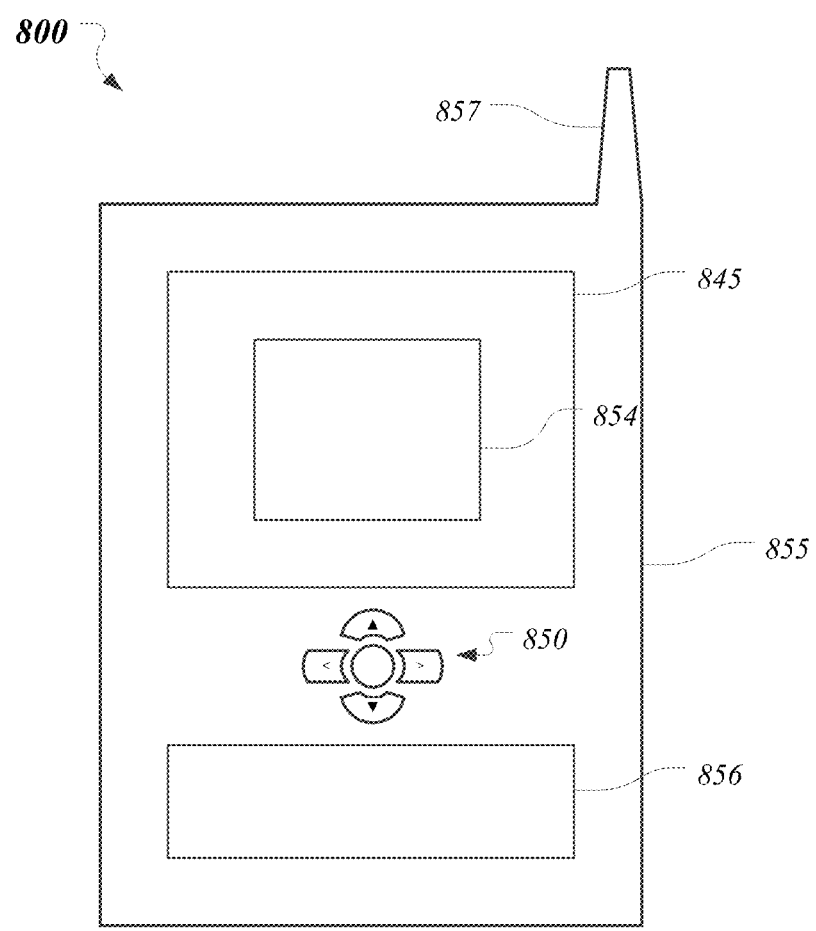
FIG. 8 illustrates one embodiment of a device.

As described above, system 700 may be embodied in varying physical styles or form factors. FIG. 8 illustrates embodiments of a small form factor device 800 in which system 700 may be embodied. In embodiments, for example, device 800 may be implemented as a mobile computing device having wireless capabilities. A mobile computing device may refer to any device having a processing system and a mobile power source or supply, such as one or more batteries, for example.

As described above, examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

Examples of a mobile computing device also may include computers that are arranged to be worn by a person, such as a wrist computer, finger computer, ring computer, eyeglass computer, belt-clip computer, arm-band computer, shoe computers, clothing computers, and other wearable computers. In embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments are not limited in this context.

As shown in FIG. 8, device 800 may include a display 845, a navigation controller 850, a user interface 854, a housing 855, an I/O device 856, and an antenna 857. Display 845 may include any suitable display unit for displaying information appropriate for a mobile computing device, and may be the same as or similar to display 745 in FIG. 7. Navigation controller 850 may include one or more navigation features which may be used to interact with user interface 854, and may be the same as or similar to navigation controller 750 in FIG. 7. I/O device 856 may include any suitable I/O device for entering information into a mobile computing device. Examples for I/O device 856 may include an alphanumeric keyboard, a numeric keypad, a touch pad, input keys, buttons, switches, rocker switches, microphones, speakers, voice recognition device and software, and so forth. Information also may be entered into device 800 by way of microphone. Such information may be digitized by a voice recognition device. The embodiments are not limited in this context.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor. Some embodiments may be implemented, for example, using a machine-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

The following examples pertain to further embodiments:

Example 1 is a video encoding apparatus, comprising an encoding component to determine whether a predicted motion for an enhancement layer block is consistent with a predicted motion for a collocated lower-layer block, determine whether to apply inter-layer residual prediction to the enhancement layer block based on whether the predicted motion for the enhancement layer block is consistent with the predicted motion for the collocated lower-layer block, and in response to a determination that inter-layer residual prediction is to be applied to the enhancement layer block, generate a second-order residual for the enhancement layer block.

In Example 2, the encoding component of Example 1 may optionally, in response to a determination that inter-layer residual prediction is to be applied to the enhancement layer block, generate a predicted residual for the enhancement layer block based on a residual for the collocated lower-layer block, and generate the second-order residual for the enhancement layer block by comparing a calculated residual for the enhancement layer block to the predicted residual.

In Example 3, the encoding component of any one of Examples 1 to 2 may optionally determine that inter-layer residual prediction is to be applied to the residual for the enhancement layer block in response to a determination that the predicted motion for the enhancement layer block is consistent with the predicted motion for the collocated lower-layer block.

In Example 4, the encoding component of any one of Examples 1 to 2 may optionally determine that inter-layer residual prediction is to be applied to the residual for the enhancement layer block in response to a determination that the predicted motion for the enhancement layer block is consistent with the predicted motion for the collocated lower-layer block and a rate-distortion cost associated with the inter-layer residual prediction is less than a threshold.

In Example 5, the encoding component of any one of Examples 1 to 4 may optionally determine whether the predicted motion for the enhancement layer block is derived from the predicted motion for the lower-layer block, and determine that inter-layer residual prediction is to be applied to the enhancement layer block in response to a determination that the predicted motion for the enhancement layer block is derived from the predicted motion for the lower-layer block.

In Example 6, the encoding component of Example 5 may optionally, in response to a determination that the predicted motion for the enhancement layer block is not derived from the predicted motion for the lower-layer block, determine that inter-layer residual prediction is to be applied to the enhancement layer block in response to a determination that a prediction direction and reference index for the enhancement layer block predicted motion are the same as a prediction direction and reference index for the lower-layer block predicted motion and a difference between a motion vector for the enhancement layer block and a motion vector for the lower-layer block is not greater than a threshold.

In Example 7, the encoding component of Example 6 may optionally scale the motion vector for the collocated lower-layer block in response to a determination that an enhancement layer aspect ratio differs from a lower-layer aspect ratio.

In Example 8, the encoding component of any one of Examples 1 to 7 may optionally determine whether an enhancement layer spatial resolution is greater than a lower-layer spatial resolution and, in response to a determination that the enhancement layer spatial resolution is greater than the lower-layer spatial resolution, apply an upsampling filter to a residual signal comprising the residual for the collocated lower-layer block to obtain an upsampled residual for the collocated lower-layer block and generate the predicted residual for the enhancement layer block based on the upsampled residual for the collocated lower-layer block.

In Example 9, the upsampling filter of Example 8 may optionally comprise a fixed poly-phase interpolation filter.

In Example 10, the upsampling filter of Example 8 may optionally comprise an adaptive interpolation filter.

In Example 11, the encoding component of any one of Examples 1 to 10 may optionally transform and quantize the second order residual for the enhancement layer block, and generate an enhancement layer substream comprising the quantized transformed second order residual.

In Example 12, the enhancement layer block of any one of Examples 1 to 11 may optionally comprise a prediction unit (PU).

In Example 13, the enhancement layer block of any one of Examples 1 to 11 may optionally comprise a coding unit (CU).

In Example 14, the encoding component of any one of Examples 1 to 13 may optionally determine the predicted motion for the enhancement layer block by encoding an enhanced content version comprising the enhancement layer block, and determine the predicted motion for the collocated lower-layer block by encoding a lower-layer content version comprising the collocated lower-layer block.

In Example 15, the encoding component of Example 14 may optionally perform High Efficiency Video Coding (HEVC) encoding of the enhanced content version and the lower-layer content version.

In Example 16, the encoding component of any one of Examples 1 to 15 may optionally generate the second-order residual using a scalable video coding technique.

In Example 17, the encoding component of Example 16 may optionally generate the second-order residual using a High Efficiency Video Coding (HEVC) Scalable Video Coding (SVC) extension.

In Example 18, the collocated lower-layer block of any one of Examples 1 to 17 may optionally comprise a block in a base layer content version.

Example 19 is a system, comprising a video encoding apparatus according to any one of Examples 1 to 17, a display communicatively coupled to the encoding component, a radio frequency (RF) transceiver, and one or more RF antennas communicatively coupled to the RF transceiver.

Example 20 is at least one machine-readable medium comprising a plurality of video encoding instructions that, in response to being executed on a computing device, cause the computing device to determine whether a predicted motion for an enhancement layer block is consistent with a predicted motion for a collocated lower-layer block, determine whether to apply inter-layer residual prediction to the enhancement layer block based on whether the predicted motion for the enhancement layer block is consistent with the predicted motion for the collocated lower-layer block, and in response to a determination that inter-layer residual prediction is to be applied to the enhancement layer block, generate a second-order residual for the enhancement layer block.

In Example 21, the at least one machine-readable medium of Example 20 may optionally comprise video encoding instructions that, in response to being executed on the computing device, cause the computing device to, in response to a determination that inter-layer residual prediction is to be applied to the enhancement layer block, generate a predicted residual for the enhancement layer block based on a residual for the collocated lower-layer block, and generate the second-order residual for the enhancement layer block by comparing a calculated residual for the enhancement layer block to the predicted residual.

In Example 22, the at least one machine-readable medium of any one of Examples 20 to 21 may optionally comprise video encoding instructions that, in response to being executed on the computing device, cause the computing device to determine that inter-layer residual prediction is to be applied to the residual for the enhancement layer block in response to a determination that the predicted motion for the enhancement layer block is consistent with the predicted motion for the collocated lower-layer block.

In Example 23, the at least one machine-readable medium of any one of Examples 20 to 21 may optionally comprise video encoding instructions that, in response to being executed on the computing device, cause the computing device to determine that inter-layer residual prediction is to be applied to the residual for the enhancement layer block in response to a determination that the predicted motion for the enhancement layer block is consistent with the predicted motion for the collocated lower-layer block and a rate-distortion cost associated with the inter-layer residual prediction is less than a threshold.

In Example 24, the at least one machine-readable medium of any one of Examples 20 to 23 may optionally comprise video encoding instructions that, in response to being executed on the computing device, cause the computing device to determine whether the predicted motion for the enhancement layer block is derived from the predicted motion for the lower-layer block, and determine that inter-layer residual prediction is to be applied to the enhancement layer block in response to a determination that the predicted motion for the enhancement layer block is derived from the predicted motion for the lower-layer block.

In Example 25, the at least one machine-readable medium of Example 24 may optionally comprise video encoding instructions that, in response to being executed on the computing device, cause the computing device to, in response to a determination that the predicted motion for the enhancement layer block is not derived from the predicted motion for the lower-layer block, determine that inter-layer residual prediction is to be applied to the enhancement layer block in response to a determination that a prediction direction and reference index for the enhancement layer block predicted motion are the same as a prediction direction and reference index for the lower-layer block predicted motion and a difference between a motion vector for the enhancement layer block and a motion vector for the lower-layer block is not greater than a threshold.

In Example 26, the at least one machine-readable medium of Example 25 may optionally comprise video encoding instructions that, in response to being executed on the computing device, cause the computing device to scale the motion vector for the collocated lower-layer block in response to a determination that an enhancement layer aspect ratio differs from a lower-layer aspect ratio.

In Example 27, the at least one machine-readable medium of any one of Examples 20 to 26 may optionally comprise video encoding instructions that, in response to being executed on the computing device, cause the computing device to determine whether an enhancement layer spatial resolution is greater than a lower-layer spatial resolution, and in response to a determination that the enhancement layer spatial resolution is greater than the lower-layer spatial resolution, apply an upsampling filter to a residual signal comprising the residual for the collocated lower-layer block to obtain an upsampled residual for the collocated lower-layer block, and generate the predicted residual for the enhancement layer block based on the upsampled residual for the collocated lower-layer block.

In Example 28, the upsampling filter of Example 27 may optionally comprise a fixed poly-phase interpolation filter.

In Example 29, the upsampling filter of Example 27 may optionally comprise an adaptive interpolation filter.

In Example 30, the at least one machine-readable medium of any one of Examples 20 to 29 may optionally comprise video encoding instructions that, in response to being executed on the computing device, cause the computing device to transform and quantizing the second order residual for the enhancement layer block, and generate an enhancement layer substream comprising the quantized transformed second order residual.

In Example 31, the enhancement layer block of any one of Examples 20 to 30 may optionally comprise a prediction unit (PU).

In Example 32, the enhancement layer block of any one of Examples 20 to 30 may optionally comprise a coding unit (CU).

In Example 33, the at least one machine-readable medium of any one of Examples 20 to 32 may optionally comprise video encoding instructions that, in response to being executed on the computing device, cause the computing device to determine the predicted motion for the enhancement layer block by encoding an enhanced content version comprising the enhancement layer block, and determine the predicted motion for the collocated lower-layer block by encoding a lower-layer content version comprising the collocated lower-layer block.

In Example 34, the at least one machine-readable medium of Example 33 may optionally comprise video encoding instructions that, in response to being executed on the computing device, cause the computing device to perform High Efficiency Video Coding (HEVC) encoding of the enhanced content version and the lower-layer content version.

In Example 35, the at least one machine-readable medium of any one of Examples 20 to 34 may optionally comprise video encoding instructions that, in response to being executed on the computing device, cause the computing device to generate the second-order residual using a scalable video coding technique.

In Example 36, the at least one machine-readable medium of Example 35 may optionally comprise video encoding instructions that, in response to being executed on the computing device, cause the computing device to generate the second-order residual using a High Efficiency Video Coding (HEVC) Scalable Video Coding (SVC) extension.

In Example 37, the collocated lower-layer block of any one of Examples 20 to 36 may optionally comprise a block in a base layer content version.

Example 38 is a video encoding method, comprising determining, by a processor circuit, whether a set of motion prediction characteristics for an enhancement layer block is consistent with a set of motion prediction characteristics for a collocated lower-layer block, determining whether to apply inter-layer residual prediction to the enhancement layer block based on whether the set of motion prediction characteristics for the enhancement layer block is consistent with the set of motion prediction characteristics for the collocated lower-layer block, and in response to a determination that inter-layer residual prediction is to be applied to the enhancement layer block, generating a second-order residual for the enhancement layer block.

In Example 39, the video encoding method of Example 38 may optionally comprise, in response to a determination that inter-layer residual prediction is to be applied to the enhancement layer block, generating a predicted residual for the enhancement layer block based on a residual for the collocated lower-layer block, and generating the second-order residual for the enhancement layer block by comparing a calculated residual for the enhancement layer block to the predicted residual.

In Example 40, the video encoding method of any one of Examples 38 to 39 may optionally comprise determining that inter-layer residual prediction is to be applied to the residual for the enhancement layer block in response to a determination that the set of motion prediction characteristics for the enhancement layer block is consistent with the set of motion prediction characteristics for the collocated lower-layer block.

In Example 41, the video encoding method of any one of Examples 38 to 39 may optionally comprise determining that inter-layer residual prediction is to be applied to the residual for the enhancement layer block in response to a determination that the set of motion prediction characteristics for the enhancement layer block is consistent with the set of motion prediction characteristics for the collocated lower-layer block and a rate-distortion cost associated with the inter-layer residual prediction is less than a threshold.

In Example 42, the video encoding method of any one of Examples 38 to 41 may optionally comprise determining whether the set of motion prediction characteristics for the enhancement layer block is derived from the set of motion prediction characteristics for the lower-layer block, and determining that inter-layer residual prediction is to be applied to the enhancement layer block in response to a determination that the set of motion prediction characteristics for the enhancement layer block is derived from the set of motion prediction characteristics for the lower-layer block.

In Example 43, the video encoding method of Example 42 may optionally comprise, in response to a determination that the set of motion prediction characteristics for the enhancement layer block is not derived from the set of motion prediction characteristics for the lower-layer block, determining that inter-layer residual prediction is to be applied to the enhancement layer block in response to a determination that a prediction direction and reference index for the enhancement layer block set of motion prediction characteristics are the same as a prediction direction and reference index for the lower-layer block set of motion prediction characteristics and a difference between a motion vector for the enhancement layer block and a motion vector for the lower-layer block is not greater than a threshold.

In Example 44, the video encoding method of Example 43 may optionally comprise scaling the motion vector for the collocated lower-layer block in response to a determination that an enhancement layer aspect ratio differs from a lower-layer aspect ratio.

In Example 45, the video encoding method of any one of Examples 38 to 44 may optionally comprise determining whether an enhancement layer spatial resolution is greater than a lower-layer spatial resolution, and in response to a determination that the enhancement layer spatial resolution is greater than the lower-layer spatial resolution, applying an upsampling filter to a residual signal comprising the residual for the collocated lower-layer block to obtain an upsampled residual for the collocated lower-layer block, and generating the predicted residual for the enhancement layer block based on the upsampled residual for the collocated lower-layer block.

In Example 46, the upsampling filter of Example 45 may optionally comprise a fixed poly-phase interpolation filter.

In Example 47, the upsampling filter of Example 45 may optionally comprise an adaptive interpolation filter.

In Example 48, the video encoding method of any one of Examples 38 to 47 may optionally comprise transforming and quantizing the second order residual for the enhancement layer block, and generating an enhancement layer substream comprising the quantized transformed second order residual.

In Example 49, the enhancement layer block of any one of Examples 38 to 48 may optionally comprise a prediction unit (PU).

In Example 50, the enhancement layer block of any one of Examples 38 to 48 may optionally comprise a coding unit (CU).

In Example 51, the video encoding method of any one of Examples 38 to 49 may optionally comprise determining the set of motion prediction characteristics for the enhancement layer block by encoding an enhanced content version comprising the enhancement layer block, and determining the set of motion prediction characteristics for the collocated lower-layer block by encoding a lower-layer content version comprising the collocated lower-layer block.

In Example 52, the video encoding method of Example 51 may optionally comprise performing High Efficiency Video Coding (HEVC) encoding of the enhanced content version and the lower-layer content version.

In Example 53, the video encoding method of any one of Examples 38 to 52 may optionally comprise generating the second-order residual using a scalable video coding technique.

In Example 54, the video encoding method of Example 53 may optionally comprise generating the second-order residual using a High Efficiency Video Coding (HEVC) Scalable Video Coding (SVC) extension.

In Example 55, the collocated lower-layer block of any one of Examples 38 to 54 may optionally comprise a block in a base layer content version.

Example 56 is an apparatus, comprising means for performing a video encoding method according to any one of Examples 38 to 55.

Example 57 is a system, comprising an apparatus according to Example 56, a display, a radio frequency (RF) transceiver, and one or more RF antennas.

Example 58 is at least one machine-readable medium comprising a plurality of instructions that, in response to being executed on a computing device, cause the computing device to perform a video encoding method according to any one of Examples 38 to 55.

Example 59 is a video encoding apparatus, comprising means for determining whether a set of motion prediction characteristics for an enhancement layer block is consistent with a set of motion prediction characteristics for a collocated lower-layer block, means for determining whether to apply inter-layer residual prediction to the enhancement layer block based on whether the set of motion prediction characteristics for the enhancement layer block is consistent with the set of motion prediction characteristics for the collocated lower-layer block, and means for, in response to a determination that inter-layer residual prediction is to be applied to the enhancement layer block, generating a second-order residual for the enhancement layer block.

In Example 60, the video encoding apparatus of Example 59 may optionally comprise means for, in response to a determination that inter-layer residual prediction is to be applied to the enhancement layer block, generating a predicted residual for the enhancement layer block based on a residual for the collocated lower-layer block, and generating the second-order residual for the enhancement layer block by comparing a calculated residual for the enhancement layer block to the predicted residual.

In Example 61, the video encoding apparatus of any one of Examples 59 to 60 may optionally comprise means for determining that inter-layer residual prediction is to be applied to the residual for the enhancement layer block in response to a determination that the set of motion prediction characteristics for the enhancement layer block is consistent with the set of motion prediction characteristics for the collocated lower-layer block.

In Example 62, the video encoding apparatus of any one of Examples 59 to 60 may optionally comprise means for determining that inter-layer residual prediction is to be applied to the residual for the enhancement layer block in response to a determination that the set of motion prediction characteristics for the enhancement layer block is consistent with the set of motion prediction characteristics for the collocated lower-layer block and a rate-distortion cost associated with the inter-layer residual prediction is less than a threshold.

In Example 63, the video encoding apparatus of any one of Examples 59 to 62 may optionally comprise means for determining whether the set of motion prediction characteristics for the enhancement layer block is derived from the set of motion prediction characteristics for the lower-layer block, and means for determining that inter-layer residual prediction is to be applied to the enhancement layer block in response to a determination that the set of motion prediction characteristics for the enhancement layer block is derived from the set of motion prediction characteristics for the lower-layer block.

In Example 64, the video encoding apparatus of Example 63 may optionally comprise means for, in response to a determination that the set of motion prediction characteristics for the enhancement layer block is not derived from the set of motion prediction characteristics for the lower-layer block, determining that inter-layer residual prediction is to be applied to the enhancement layer block in response to a determination that a prediction direction and reference index for the enhancement layer block set of motion prediction characteristics are the same as a prediction direction and reference index for the lower-layer block set of motion prediction characteristics and a difference between a motion vector for the enhancement layer block and a motion vector for the lower-layer block is not greater than a threshold.

In Example 65, the video encoding apparatus of Example 64 may optionally comprise means for scaling the motion vector for the collocated lower-layer block in response to a determination that an enhancement layer aspect ratio differs from a lower-layer aspect ratio.

In Example 66, the video encoding apparatus of any one of Examples 59 to 65 may optionally comprise means for determining whether an enhancement layer spatial resolution is greater than a lower-layer spatial resolution, and means for, in response to a determination that the enhancement layer spatial resolution is greater than the lower-layer spatial resolution, applying an upsampling filter to a residual signal comprising the residual for the collocated lower-layer block to obtain an upsampled residual for the collocated lower-layer block, and generating the predicted residual for the enhancement layer block based on the upsampled residual for the collocated lower-layer block.

In Example 67, the upsampling filter of Example 66 may optionally comprise a fixed poly-phase interpolation filter.

In Example 68, the upsampling filter of Example 66 may optionally comprise an adaptive interpolation filter.

In Example 69, the video encoding apparatus of any one of Examples 59 to 68 may optionally comprise means for transforming and quantizing the second order residual for the enhancement layer block, and means for generating an enhancement layer substream comprising the quantized transformed second order residual.

In Example 70, the enhancement layer block of any one of Examples 59 to 69 may optionally comprise a prediction unit (PU).

In Example 71, the enhancement layer block of any one of Examples 59 to 69 may optionally comprise a coding unit (CU).

In Example 72, the video encoding apparatus of any one of Examples 59 to 71 may optionally comprise means for determining the set of motion prediction characteristics for the enhancement layer block by encoding an enhanced content version comprising the enhancement layer block, and means for determining the set of motion prediction characteristics for the collocated lower-layer block by encoding a lower-layer content version comprising the collocated lower-layer block.

In Example 73, the video encoding apparatus of Example 72 may optionally comprise means for performing High Efficiency Video Coding (HEVC) encoding of the enhanced content version and the lower-layer content version.

In Example 74, the video encoding apparatus of any one of Examples 59 to 73 may optionally comprise means for generating the second-order residual using a scalable video coding technique.

In Example 75, the video encoding apparatus of Example 74 may optionally comprise means for generating the second-order residual using a High Efficiency Video Coding (HEVC) Scalable Video Coding (SVC) extension.

In Example 76, the collocated lower-layer block of any one of Examples 59 to 75 may optionally comprise a block in a base layer content version.

Example 77 is a system, comprising a video encoding apparatus according to Example 76, a display, a radio frequency (RF) transceiver, and one or more RF antennas.

Numerous specific details have been set forth herein to provide a thorough understanding of the embodiments. It will be understood by those skilled in the art, however, that the embodiments may be practiced without these specific details. In other instances, well-known operations, components, and circuits have not been described in detail so as not to obscure the embodiments. It can be appreciated that the specific structural and functional details disclosed herein may be representative and do not necessarily limit the scope of the embodiments.

Some embodiments may be described using the expression "coupled" and "connected" along with their derivatives. These terms are not intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers or other such information storage, transmission or display devices. The embodiments are not limited in this context.

It should be noted that the methods described herein do not have to be executed in the order described, or in any particular order. Moreover, various activities described with respect to the methods identified herein can be executed in serial or parallel fashion.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. It is to be understood that the above description has been made in an illustrative fashion, and not a restrictive one. Combinations of the above embodiments, and other embodiments not specifically described herein will be apparent to those of skill in the art upon reviewing the above description. Thus, the scope of various embodiments includes any other applications in which the above compositions, structures, and methods are used.

It is emphasized that the Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate preferred embodiment. In the appended claims, the terms "including" and "in which" are used as the plain-English equivalents of the respective terms "comprising" and "wherein," respectively. Moreover, the terms "first," "second," and "third," etc. are used merely as labels, and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. An apparatus, comprising:
  an encoding component to determine whether a predicted motion for an enhancement layer block is consistent with a predicted motion for a collocated lower-layer block, determine whether to apply inter-layer residual prediction to the enhancement layer block based on whether the predicted motion for the enhancement layer block is consistent with the predicted motion for the collocated lower-layer block, and in response to a determination that inter-layer residual prediction is to be applied to the enhancement layer block, generate a second-order residual for the enhancement layer block, the encoding component to determine whether the predicted motion for the enhancement layer block is derived from the predicted motion for the lower-layer block, and determine that inter-layer residual prediction is to be applied to the enhancement layer block in response to a determination that the predicted motion for the enhancement layer block is derived from the predicted motion for the lower-layer block, the encoding component to, in response to a determination that the predicted motion for the enhancement layer block is not derived from the predicted motion for the lower-layer block, determine that inter-layer residual prediction is to be applied to the enhancement layer block in response to a determination that a prediction direction and reference index for the enhancement layer block predicted motion are the same as a prediction direction and reference index for the lower-layer block predicted motion and a difference between a motion vector for the enhancement layer block and a motion vector for the lower-layer block is not greater than a threshold.

2. The apparatus of claim 1, the encoding component to, in response to a determination that inter-layer residual prediction is to be applied to the enhancement layer block, generate a predicted residual for the enhancement layer block based on a residual for the collocated lower-layer block, and generate the second-order residual for the enhancement layer block by comparing a calculated residual for the enhancement layer block to the predicted residual.

3. The apparatus of claim 1, the encoding component to determine that inter-layer residual prediction is to be applied to the residual for the enhancement layer block in response to a determination that the predicted motion for the enhancement layer block is consistent with the predicted motion for the collocated lower-layer block.

4. The apparatus of claim 1, the encoding component to determine that inter-layer residual prediction is to be applied to the residual for the enhancement layer block in response to a determination that the predicted motion for the enhancement layer block is consistent with the predicted motion for the collocated lower-layer block and a rate-distortion cost associated with the inter-layer residual prediction is less than a threshold.

5. The apparatus of claim 1, the encoding component to scale the motion vector for the collocated lower-layer block in response to a determination that an enhancement layer aspect ratio differs from a lower-layer aspect ratio.

6. The apparatus of claim 1, the encoding component to determine whether an enhancement layer spatial resolution is greater than a lower-layer spatial resolution and, in response to a determination that the enhancement layer spatial resolution is greater than the lower-layer spatial resolution, apply an upsampling filter to a residual signal comprising the residual for the collocated lower-layer block to obtain an upsampled residual for the collocated lower-layer block and generate the predicted residual for the enhancement layer block based on the upsampled residual for the collocated lower-layer block.

7. The apparatus of claim 1, comprising:
  a display communicatively coupled to the encoding component;
  a radio frequency (RF) transceiver; and
  one or more RF antennas communicatively coupled to the RF transceiver.

8. A method, comprising:
  determining, by a processor circuit, whether a set of motion prediction characteristics for an enhancement layer block is consistent with a set of motion prediction characteristics for a collocated lower-layer block;
  determining whether to apply inter-layer residual prediction to the enhancement layer block based on whether the set of motion prediction characteristics for the enhancement layer block is consistent with the set of motion prediction characteristics for the collocated lower-layer block;
  determining whether the set of motion prediction characteristics for the enhancement layer block is derived from the set of motion prediction characteristics for the lower-layer block;
  determining that inter-layer residual prediction is to be applied to the enhancement layer block in response to a determination that the set of motion prediction characteristics for the enhancement layer block is derived from the set of motion prediction characteristics for the lower-layer block;
  in response to a determination that the set of motion prediction characteristics for the enhancement layer block is not derived from the set of motion prediction characteristics for the lower-layer block, determining that inter-layer residual prediction is to be applied to the enhancement layer block in response to a determination that a prediction direction and reference index for the enhancement layer block set of motion prediction characteristics are the same as a prediction direction and reference index for the lower-layer block set of motion prediction characteristics and a difference between a motion vector for the enhancement layer block and a motion vector for the lower-layer block is not greater than a threshold; and in response to a determination that inter-layer residual prediction is to be applied to the enhancement layer block, generating a second-order residual for the enhancement layer block.

9. The method of claim 8, comprising:
in response to a determination that inter-layer residual prediction is to be applied to the enhancement layer block:
generating a predicted residual for the enhancement layer block based on a residual for the collocated lower-layer block; and
generating the second-order residual for the enhancement layer block by comparing a calculated residual for the enhancement layer block to the predicted residual.

10. The method of claim 8, comprising determining that inter-layer residual prediction is to be applied to the residual for the enhancement layer block in response to a determination that the set of motion prediction characteristics for the enhancement layer block is consistent with the set of motion prediction characteristics for the collocated lower-layer block.

11. The method of claim 8, comprising determining that inter-layer residual prediction is to be applied to the residual for the enhancement layer block in response to a determination that the set of motion prediction characteristics for the enhancement layer block is consistent with the set of motion prediction characteristics for the collocated lower-layer block and a rate-distortion cost associated with the inter-layer residual prediction is less than a threshold.

12. The method of claim 8, comprising scaling the motion vector for the collocated lower-layer block in response to a determination that an enhancement layer aspect ratio differs from a lower-layer aspect ratio.

13. The method of claim 8, comprising:
determining whether an enhancement layer spatial resolution is greater than a lower-layer spatial resolution; and
in response to a determination that the enhancement layer spatial resolution is greater than the lower-layer spatial resolution:
applying an upsampling filter to a residual signal comprising the residual for the collocated lower-layer block to obtain an upsampled residual for the collocated lower-layer block; and
generating the predicted residual for the enhancement layer block based on the upsampled residual for the collocated lower-layer block.

14. At least one non-transitory machine-readable medium comprising a plurality of instructions that, in response to being executed on a computing device, cause the computing device to:
determine whether a predicted motion for an enhancement layer block is consistent with a predicted motion for a collocated lower-layer block;
determine whether to apply inter-layer residual prediction to the enhancement layer block based on whether the predicted motion for the enhancement layer block is consistent with the predicted motion for the collocated lower-layer block; determine whether the predicted motion for the enhancement layer block is derived from the predicted motion for the lower-layer block; and
determine that inter-layer residual prediction is to be applied to the enhancement layer block in response to a determination that the predicted motion for the enhancement layer block is derived from the predicted motion for the lower-layer block;
in response to a determination that the predicted motion for the enhancement layer block is not derived from the predicted motion for the lower-layer block, determine that inter-layer residual prediction is to be applied to the enhancement layer block in response to a determination that a prediction direction and reference index for the enhancement layer block predicted motion are the same as a prediction direction and reference index for the lower-layer block predicted motion and a difference between a motion vector for the enhancement layer block and a motion vector for the lower-layer block is not greater than a threshold; and
in response to a determination that inter-layer residual prediction is to be applied to the enhancement layer block, generate a second-order residual for the enhancement layer block.

15. The at least one non-transitory machine-readable medium of claim 14, comprising instructions that, in response to being executed on the computing device, cause the computing device to:
in response to a determination that inter-layer residual prediction is to be applied to the enhancement layer block:
generate a predicted residual for the enhancement layer block based on a residual for the collocated lower-layer block; and
generate the second-order residual for the enhancement layer block by comparing a calculated residual for the enhancement layer block to the predicted residual.

16. The at least one non-transitory machine-readable medium of claim 14, comprising instructions that, in response to being executed on the computing device, cause the computing device to determine that inter-layer residual prediction is to be applied to the residual for the enhancement layer block in response to a determination that the predicted motion for the enhancement layer block is consistent with the predicted motion for the collocated lower-layer block.

17. The at least one non-transitory machine-readable medium of claim 14, comprising instructions that, in response to being executed on the computing device, cause the computing device to determine that inter-layer residual prediction is to be applied to the residual for the enhancement layer block in response to a determination that the predicted motion for the enhancement layer block is consistent with the predicted motion for the collocated lower-layer block and a rate-distortion cost associated with the inter-layer residual prediction is less than a threshold.

18. The at least one non-transitory machine-readable medium of claim 14, comprising instructions that, in response to being executed on the computing device, cause the computing device to scale the motion vector for the collocated lower-layer block in response to a determination that an enhancement layer aspect ratio differs from a lower-layer aspect ratio.

19. The at least one non-transitory machine-readable medium of claim 14, comprising instructions that, in response to being executed on the computing device, cause the computing device to:
  determine whether an enhancement layer spatial resolution is greater than a lower-layer spatial resolution; and
  in response to a determination that the enhancement layer spatial resolution is greater than the lower-layer spatial resolution:
    apply an upsampling filter to a residual signal comprising the residual for the collocated lower-layer block to obtain an upsampled residual for the collocated lower-layer block; and
    generate the predicted residual for the enhancement layer block based on the upsampled residual for the collocated lower-layer block.

* * * * *